United States Patent [19]

Shoji et al.

[11] Patent Number: 5,764,908
[45] Date of Patent: Jun. 9, 1998

[54] NETWORK SYSTEM CONTAINING PROGRAM MODULES RESIDING IN DIFFERENT COMPUTERS AND EXECUTING COMMANDS WITHOUT RETURN RESULTS TO CALLING MODULES

[75] Inventors: Wataru Shoji; Daisuke Tabuchi; Ichiro Nakajima, all of Tokyo, Japan

[73] Assignee: Sofmap Future Design, Inc., Tokyo, Japan

[21] Appl. No.: 680,722

[22] Filed: Jul. 12, 1996

[51] Int. Cl.$^6$ ................................................ G06F 15/16
[52] U.S. Cl. ........................ 395/200.47; 395/200.46; 395/200.33
[58] Field of Search .................. 395/200.01, 200.019, 395/160, 600–604, 200.47, 200.46, 200.33

[56] References Cited

U.S. PATENT DOCUMENTS

| | | | |
|---|---|---|---|
| 5,530,852 | 6/1996 | Meske et al. | 395/600 |
| 5,572,643 | 11/1996 | Judson | 395/793 |
| 5,590,197 | 12/1996 | Chen et al. | 380/24 |
| 5,623,589 | 4/1997 | Needham et al. | 395/160 |
| 5,623,656 | 4/1997 | Lyons | 395/610 |
| 5,625,731 | 4/1997 | Cline et al. | 395/335 |
| 5,630,066 | 5/1997 | Gosling | 395/200.09 |
| 5,649,186 | 7/1997 | Ferguson | 395/610 |

OTHER PUBLICATIONS

Bill N. Schilit, et al.: "TeleWeb: Loosely Connected Access to the World Wide Web", Computer Network and ISDN Systems, vol. 28, No. 11, May 1996, pp. 1431–1444.

Daniel Nachbar: "When Network File Systems Aren't Enough: Automatic Software Distribution Revisited", Usenix Summer Conference Proceedings, 9 Jun. 1986, pp. 159–171.

Adam Dingle, et al., "Web Cache Coherence", Computer Network and ISDN Systems, vol. 28, No. 11, May 1996, pp. 907–920.

Primary Examiner—Parshotam S. Lall
Assistant Examiner—Zarni Maung
Attorney, Agent, or Firm—H. C. Chan

[57] ABSTRACT

A computer network system of the present invention contains program modules residing in different computers and executing commands without return results to calling program modules. The system contains a communication network connecting a plurality of computers. It also contains a plurality of program modules each associated with a parameter file. These program modules can send commands to other program modules. The program modules executes these commands without returning results to the calling program modules. The parameter files and program modules may locate in different computers of the network system. The system contains means for downloading a parameter file to a computer containing its associated program module and means for invoking the program module in response to downloading of the parameter file.

14 Claims, 18 Drawing Sheets

NETWORK SYSTEM CONTAINING PROGRAM MODULES RESIDING IN DIFFERENT COMPUTERS AND EXECUTING COMMANDS WITHOUT RETURN RESULTS TO CALLING MODULES

BACKGROUND OF THE INVENTION

Microcomputers have evolved from simple 8-bit electronic toys to powerful business management tools. Almost all large and medium size companies in this country now use at least one microcomputer for business purposes. As a result of mass production, the price of microcomputers dropped drastically over the last few years. Currently, microcomputers are within the reach of many homes and small companies.

In order to make computers more useful in a corporate environment, many companies connect their desktop microcomputers in local area networks. Currently, some companies also install wide-area communication networks so that information can be shared among microcomputers dispersed over many cities. The experiences of these companies confirm that sharing of information among computers increases the overall productivity of the whole system.

However, computers owned by different companies are generally not linked together. Further, the computers owned by homes and small companies tend to be stand-alone desktop machines. Consequently, there is no sharing of information among all the computers. The availability of a wide-area network called the "Internet" changes the situation and potentially allows all these computer to be electronically connected.

The Internet grew out of research in the 1960s to design a robust wide-area data communication network. For a long time, the Internet was used by researchers in universities and national laboratories to share information. As the existence of the Internet became more widely known, many users outside of the academic/research community (e.g., employees of large corporations) started to use Internet to carry electronic mails. In late 1980s, a wide-area information system know as the World Wide Web ("the Web") was developed. The Web is a wide-area hypermedia information publishing and retrieval system aimed to give universal access to a large universe of documents. At that time, the Web was known to and used by the academic/research community only. There was no easily available tool which allows a technically untrained person to access the Web. An development in Internet is the release of a software called a Web "browser." It has a simple but powerful graphic interface. The browser allows a user to retrieve web documents and navigate the Web using simple commands and popular tools such as point-and-click. Because the user does not have to be technically trained and the browser is pleasant to use, it has the potential of opening up the Internet to the masses.

A document designed to be accessed and read over the Web is written in a language called the "Hypertext Markup Language" (the "HTML"). The HTML document, when interpreted by a Web browser, is able to display text, images and other multimedia contents. However, the HTML document itself is merely an ASCII coded text document together with "tags" of predefined format that add some features to the basic text. As a result, the multimedia presentation (e.g., computer display) generated by the HTML document can only contain simple structure.

Another problem of HTML document is that it is difficult to design. As explained above, HTML document is an ASCII coded document while the final display is a multimedia presentation. It is not easy to relate the ASCII document to the presentation. Even though there are tools that help users to write HTML documents, these tools are not easy to use. Consequently, only well-trained persons are able to design HTML documents. Thus, most user can only be a recipient of information instead of being able to share their information.

Recently, there are movements to improve the basic Web architecture. When the Web was first developed, the aim was to share documents. It has been pointed out that programs can also be shared over the Internet. In this systems, a first computer can send program code to a second computer via the Internet. The second computer then executes the code so as to dynamically alter the display generated by a browser. As a result, the Web can be changed from a passive wide-area document sharing system to a dynamic information processing system. Examples of such developments are Java and ActiveX. Java is a variation of a popular programming language called "C++" while ActiveX derives from Microsoft's Object Linking and Embedding (OLE).

Even though sharing program code is a powerful idea, the current direction of implementation (e.g., Java and ActiveX) is counter to the trend of opening the resource of the Internet to a large number of users. Both Java and ActiveX require writing computer programs by experienced programmers. These programs are more difficult to write than HTML documents. Thus, the current direction reduces the number of users who can participate interactively in the Internet experience.

SUMMARY OF THE INVENTION

The present invention involves applying a new programming architecture, called the "digital cell technology," to a digital data network. In this invention, the multimedia files used in the cells, which are program modules used in developing applications and having a specialized structure, could be obtained from other computers connected to the data network. As a result, the number of multimedia files that could be used in applications increases drastically.

Each cell in the digital cell technology is associated with one or more parameter files (called DNA files). These files contain parameters to define many characteristics of their associated cells. In some embodiment of cells, the DNA files also provide means for cells to communicate with each other. One aspect of the present invention involves distributing these DNA files to various computers connected to a data network.

These and other features and advantages can be understood from the following detailed description of the invention together with the accompanying drawings.

DETAILED DESCRIPTION OF THE INVENTION

Figure 1:
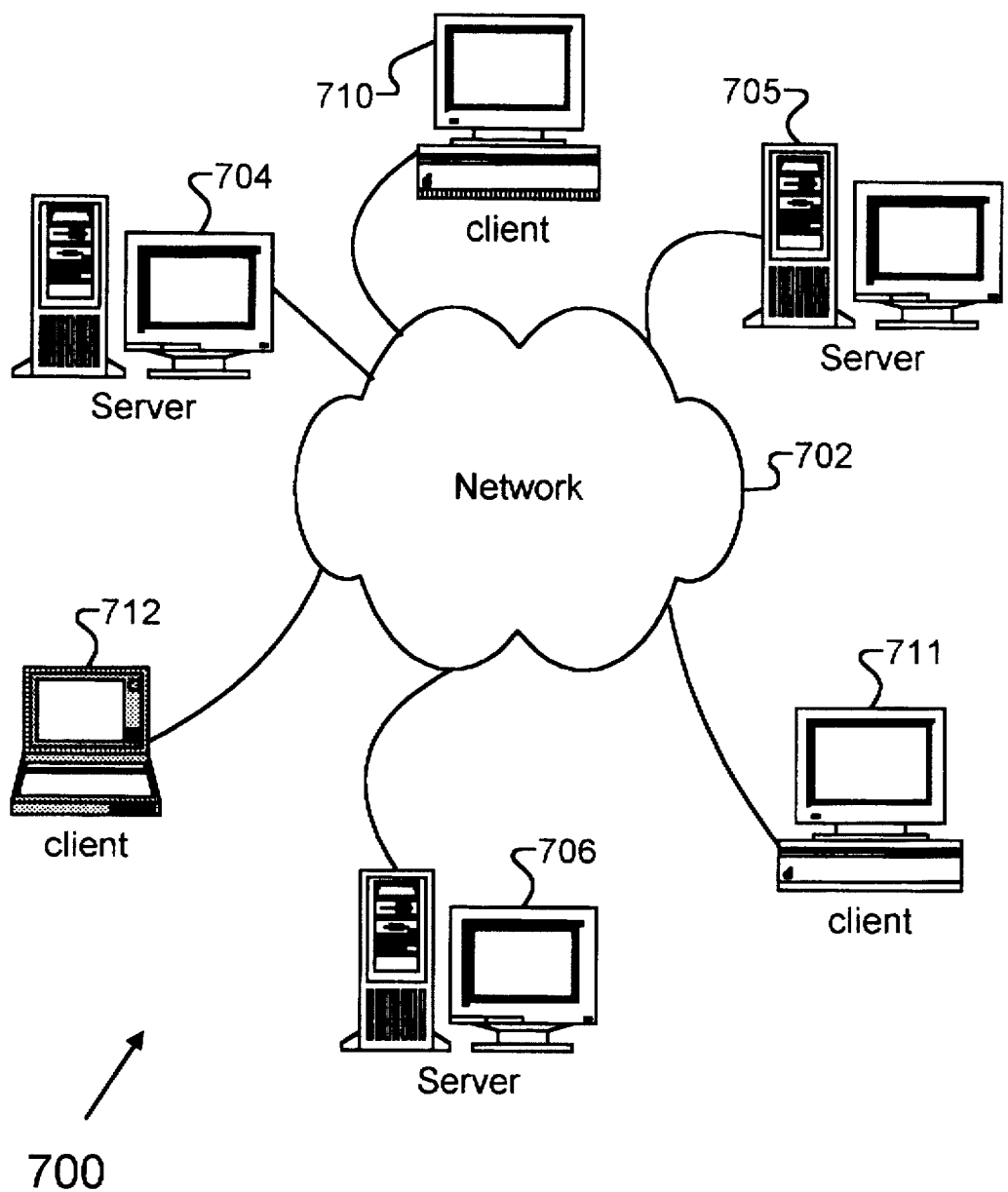
FIG. 1 is a drawing of a computer network which can be used in the present invention.

The present invention can be used in a computer network system 700 of FIG. 1. System 700 comprises a data communication network 702 (such as a local area network, wide-are network, or the Internet) a plurality of servers, such as servers 704–706, and a plurality of client computers, such as computers 710–712. Preferably, the servers contain a large database of multimedia content (such as images, audio files, video files, text documents, etc.). The servers may also contain pointers to other computers which contain such databases. Some of the client computers run an operating environment designed under the "digital cell technology" ("DCT"). A detailed description of this technology is provided in a section entitled "Detailed description of the DCT". This technology will be described briefly here to the extent necessary to understand the present invention. One aspect of the present invention is to extend DCT to a data network environment.

Multimedia Files Downloaded from Remote Servers

Figure 2:
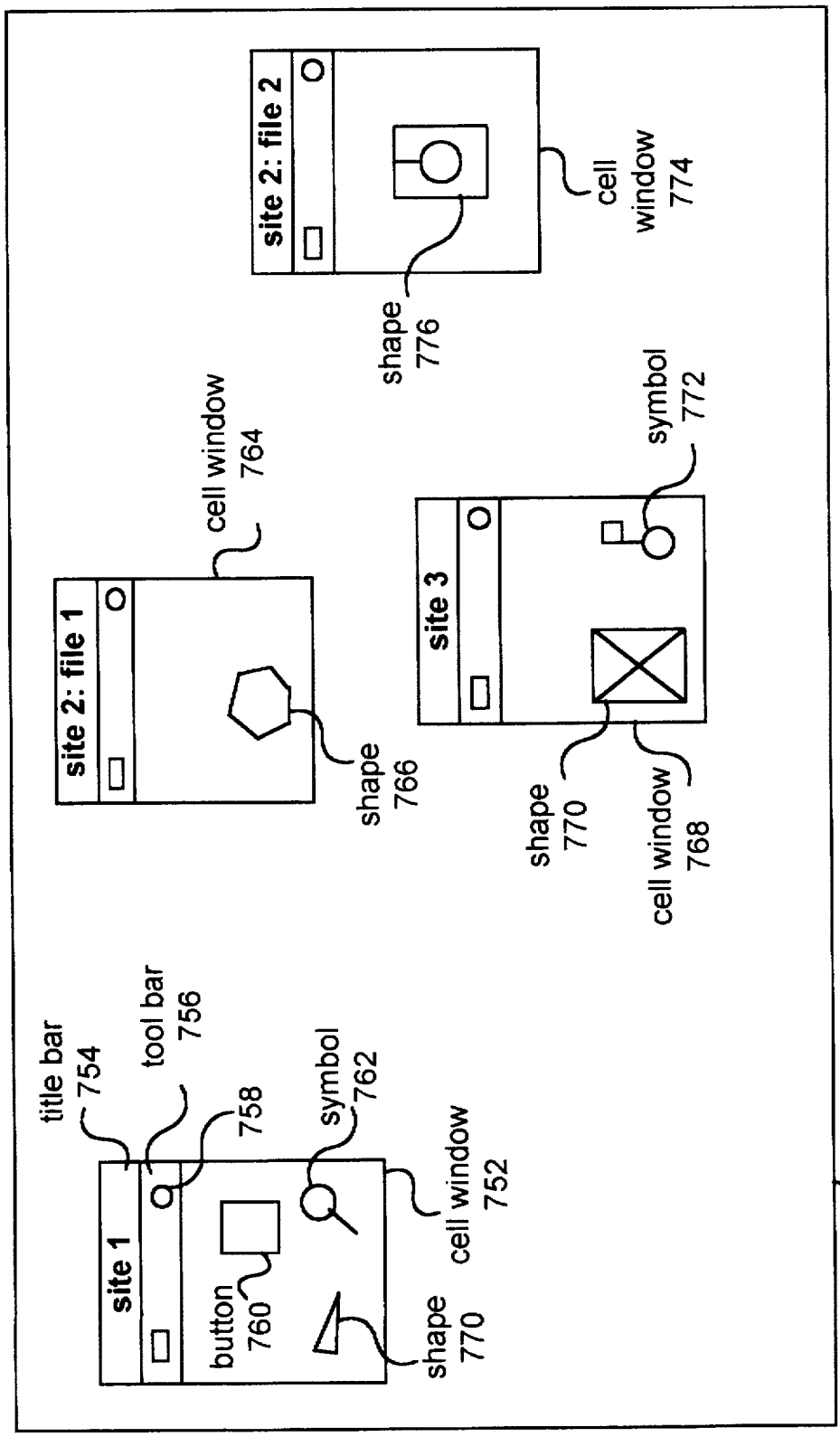
FIG. 2 is a drawing showing multiple windows associated with program cells of the present invention.

In DCT, applications are formed by managing a plurality of small program "cells." Each cell is associated with a parameter file (called "DNA" file in the terminology of DCT). The DNA file contains parameters to define some of the characteristics of its associated cell. The DNA file may also provides means for one cell to communicate instructions with other cells. In one implementation of DCT, some of the cells generate a display window upon execution. FIG. 2 is a drawing showing a display 750 of a computer monitor. It contains four display windows, 752, 764, 768 and 774, each associated with a cell. The details of these windows will be explained below.

Figure 3:
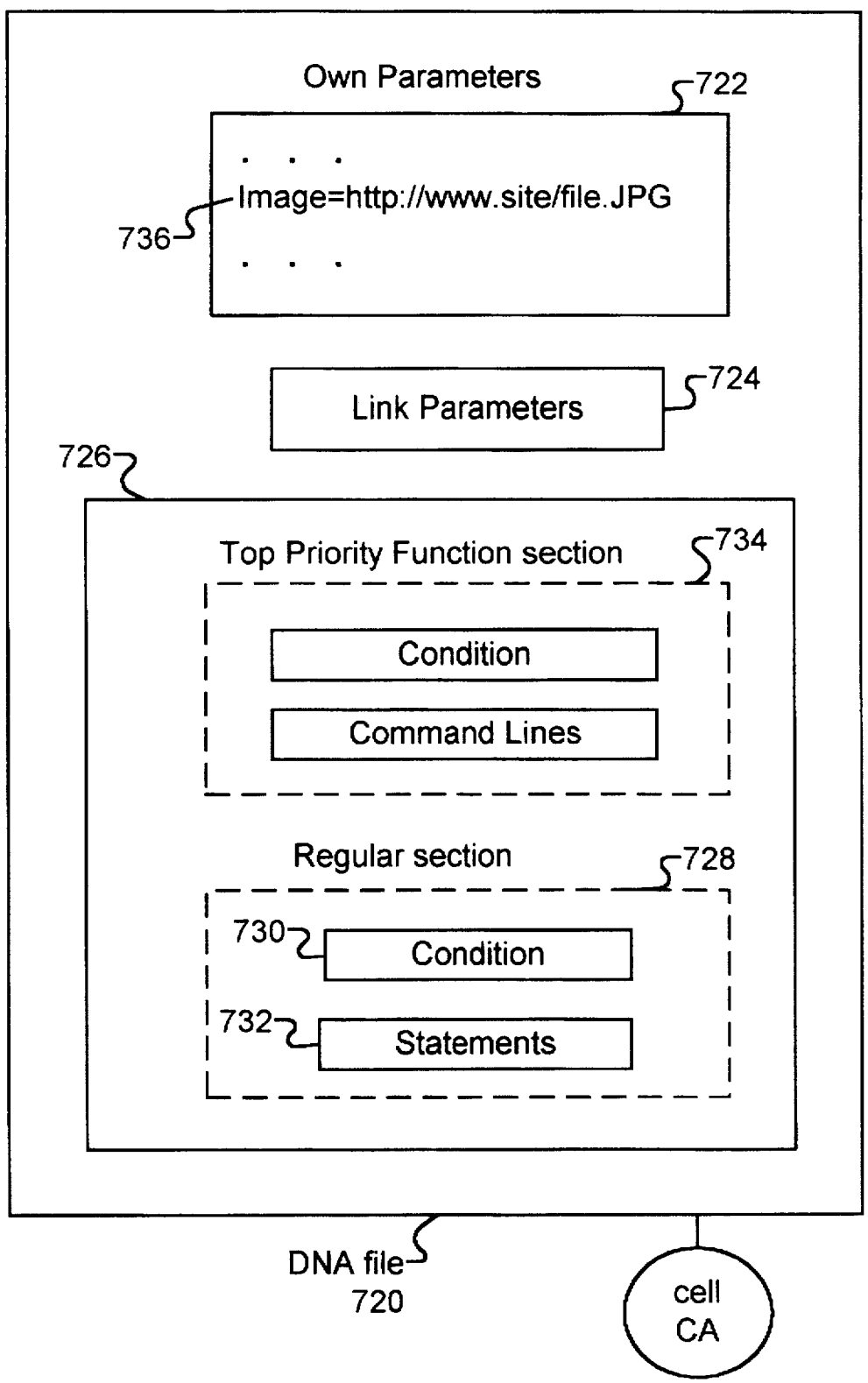
FIG. 3 is a drawing showing the structure of a DNA files of the present invention.

FIG. 3 shows the structure of an exemplary DNA file 720 associated with a cell CA. Cell CA resides in a client computer, such as computer 710. The focus here is a statement 736 (i.e., "IMAGE=http://www.site/file.JPG") under a "own parameter" section 722. In the cells disclosed in the section entitled "Detailed Description of the DCT", the image file of its display is located in the hard disk of the client computer. In the present invention, the image file could be located in another computer connected to network 702.

More specifically, each file accessible by computers connected to the Web must have an address in a recognized format, called the Uniform Resource Locator ("URL"), that enables computers all over the world to access it. Statement 736 indicates that the image file has a URL of "www.site/file.JPG". In order to obtain the image file, cell CA causes client computer 710 to send a request (via network 702) for a file named "file.JPG" to the server containing the file (such as server 704). In the Microsoft ("MS") Windows environment, cell CA would call a WinSock module to initiate a TCP/IP communication with server 704. In response, server 704 delivers the file "file.JPG" in its database to client computer 710, which in turn delivers the file to cell CA using regular MS Windows notification protocol. If server 704 is running under a MS Windows environment, server 704 also uses a WinSock module to receive information from and send information to client computer 710. As a result, cell CA can generate a display window in accordance with the parameters in its associated DNA file.

It should be noted that the downloaded file is not limited to image files. Other types of files, such as audio and video files, can also be specified in the own parameter section of a DNA file as remotely located files. Further, the communication protocol does not have to be the hypertext transport protocol (HTTP). Any kind of protocol allowing transfer of files over network 702 could be used. Further, server 704 could operate under various operating environments, including UNIX, Macintosh, and DCT.

Once the image file is obtained from the server, cell CA behaves like a regular cell disclosed in the section entitled "Detailed Description of the DCT". For example, a user can manipulate the cell by linking other cells to it. Some of these linked cells may also obtain its image file from various servers in the Internet. When these cells are launched, they obtain their image (or other) files using the same method described above.

An example of this linking can be seen in FIG. 2. For illustrative purposes, assume that window 752 is a display generated by cell CA of FIG. 3. It has a title bar 754 containing a title (i.e., "site 1") of the display. In this illustrative example, the titles of all the windows in FIG. 2 show the origin (i.e., in the form of server "site 1", "site 2", etc.) of the display images. The actual title of a cell can, of course, contain any words or symbols. Thus, windows 752, 764, 768 and 774 contain images that are downloaded from sites 1, 2, 3 and 2, respectively. Window 752 also contains a tool bar 756 having a plurality of tools (such as tool 758) for manipulating window 752 (and the underlying cell). Examples of tools are edit tool for accessing an edit mode (for editing the window) and tools for invoking other pre-defined cells. In this embodiment of the present invention, all the windows in display 750 have title bars and tool bars In this illustrative example, the image of window 752 includes a shape 761. Users can link a button cell (represented as button 760) and a visual cell (represented as symbol 762) to window 752. The method to link cells to an existing cell has been disclosed in the section entitled "Detailed Description of the DCT". Each of these two cells has a DNA file. The IMAGE parameters in these DNA files could specify a local or a remote image file. It should be noted that any number of (or none) cells can be linked to window 752.

When a user clicks on button 760, the underlying button cell is launched. Window 764 is generated. In this example, the image (having a shape 766) is generated based on one of the files (called "file 1" in this example) stored in site 2.

When a user click on symbol 760, the underlying visual cell is launched. Window 768 is generated. In this example, the image (having a shape 770) is generated based on a file in site 3. Users can attached another visual cell (represented by a symbol 772) to window 768.

When a user click on symbol 772, the underlying visual cell is launched. Window 774 is generated. In this example, the image (having a shape 776) is generated based on another file (called "file 2" in this example) stored in site 2.

Note that some of the cells in the illustrative example of FIG. 2 could have a locally stored image file. There is no need to have all the image files downloaded via network 702.

Windows 752, 756, 768 and 774 are each associated with a DNA file. The link parameter sections of these DNA files contain the file names (both local or remote) of the DNA files which are linked to the corresponding cells. For example, the link parameter section of the DNA file associated with window 752 contains the file names of the button and visual cells associated with windows 764 and 768, respectively. In this example, the file names are in URL format because these files are remotely located.

Figure 4:
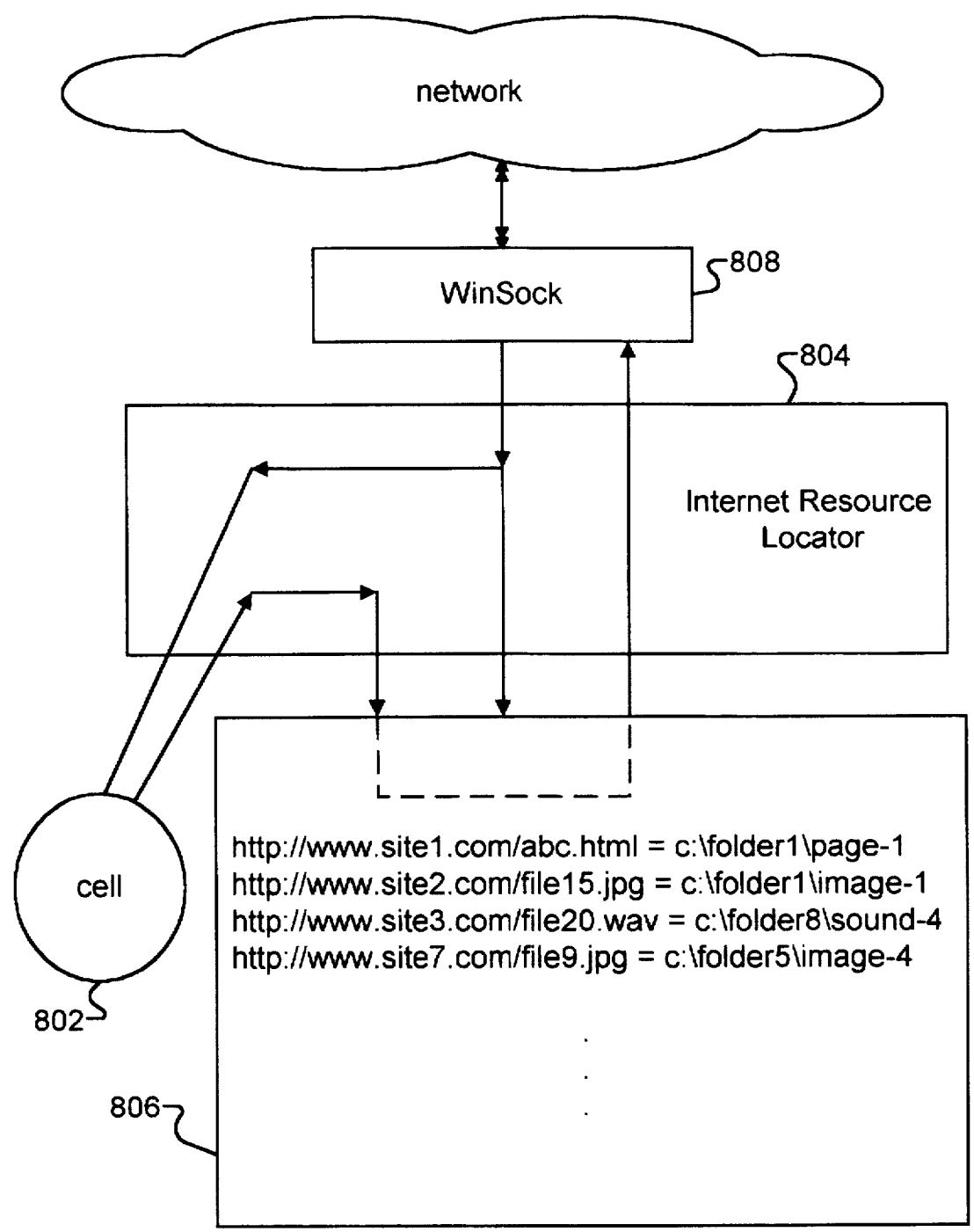
FIG. 4 is a block diagram showing a cache design of the present invention.

In the preferred embodiment of the present invention, a URL cache is included. This cache stores in a hard disk all the URLs processed by a client computer. FIG. 4 shows a block diagram showing an implementation of the URL cache. When an exemplary cell 802 wishes to access a remote file, it issues a command to a program module called the "internet resource loader" 804. Loader 804 first check a cache list 806, which contains a list of URLs that have previously been downloaded from the network and stored in the local hard disk. Thus, each URL in the list is associated with a file address in a local hard disk. When the URL of the desired file is in cache list 806, loader 804 fetches the file from the local hard disk instead of downloading it from the network. If the URL of the desired file is not in cache list 806, loader 804 called WinSock 808 to download the desired file. Upon receiving the remote file from the network, WinSock 808 delivers it to loader 804, which in turn causes the operating system to store it in an appropriate local file. The address of the local file together with the URL are added to cache list 806. From this time on, the client computer has access to this file without the need to obtain it from the network.

The implementation of loader 804 can be easily performed by a person skilled in the art based on the above description of its activities.

It is know that some servers update the content of its files frequently. For example, if a server contains files related to prices and specification of products, these files need to be updated whenever the price or specification information is changed. In the above embodiment, the URL cache would prevent users from accessing these updated files because loader 804 would fetch the files from its cache instead of from the server. There are at least three methods to handle this situation. The first method is to allow a user to clear all entries in the cache. As a result, a remotely located file must be fetched from the network. The second method is to allow a user to clear entries related to selected applications. Thus, remotely located files related to these applications will be fetched from the network. The third method is to allow a user to remotely reload all files appearing on a screen. These methods can be implemented using a number of ways. For example, the cache list could be in ASCII form, and the entries therein could be erased (in total or selectively), marked, or replaced in accordance with the desire of the user.

Distributable DNA Files

In the above illustrative examples, the DNA files are stored locally in the client computer even though the multimedia files referred to in the DNA files could be remotely located. In another embodiment of the present invention, the DNA files could be stored in a server. Client computers can download appropriate DNA files from the server so as to create and execute an application.

An embodiment of the present invention in a MS Windows environment is described. Under MS Windows, it is possible to associate a file having a predefined extension with a certain application. As an example, files having the extensions "SFM" and "SFR" can be made to invoke a visual and a run cell, respectively, operating under DCT. In one embodiment of the present invention, all the DNA files are ASCII files. These DNA files define an application through their own and link parameters. By downloading these DNA files and invoking associated cells to a client computer, the client computer can execute an application stored in a server by transferring ASCII files (as opposed to program codes).

Figure 5:
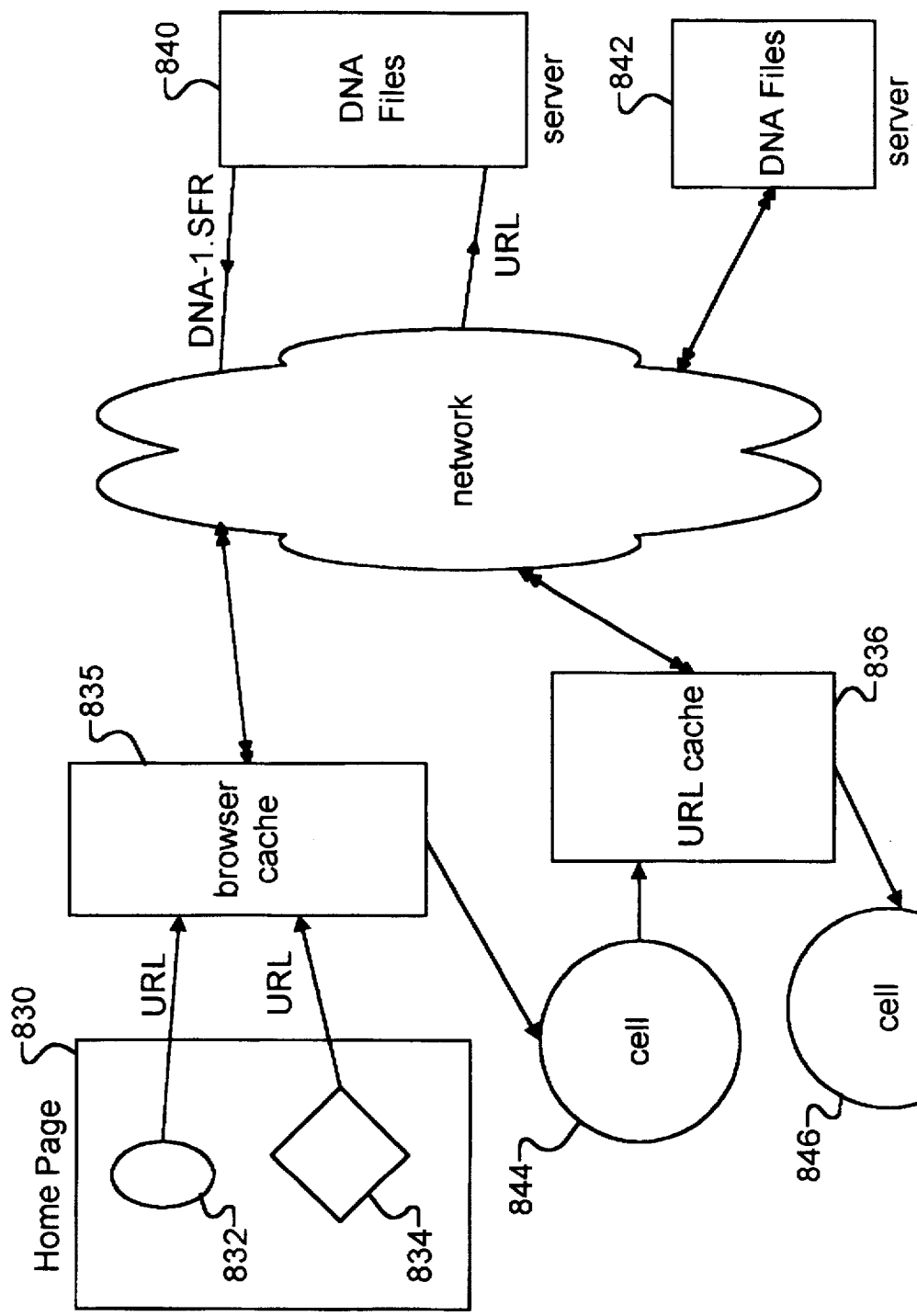
FIG. 5 is a schematic diagram showing distributable DNA files of the present invention.

FIG. 5 is a schematic diagram illustrating distributable DNA files of the present invention. The browser (not shown) of a client computer may display a Web home page 830 which contains icons 832 and 834 indicating downloadable DNA files. The HTML document (not shown) corresponding to home page 830 contains "tags" which allows a browser to generate icons 832 and 834. In the present invention, these tags contain the URL of the DNA files. When any one of these icons are clicked, the browser accesses its own cache 835 to determine if the corresponding DNA file (for convenience in this discussion, this DNA file is called the "home page DNA file") is in cache 835. If it is in the cache, the browser can invoke the cell associated with the DNA file (e.g., a visual cell) without the need for downloading the file. If it is not in the cache, the browser causes the DNA file to be downloaded from a server (e.g., server 840). The corresponding cell is then invoked by the operating system based on the extension of the downloaded DNA file.

As an example, icon 832 is linked to a DNA file called "DNA-1.SFR." Because this file is not in browser cache 835, it is downloaded from server 840. Once downloaded, the browser invokes a run cell 844. The characteristics of the window associated with cell 844 is defined by DNA-1.SFR.

Note that up to this point, no URL cache is involved. This is because a URL cache is invoked when a cell (instead of a web browser) attempts to download a file. In this embodiment, a URL cache 836 would be used if the DNA file of an associated cell makes reference to a second DNA file which is located remotely. At that time, the procedure discussed above in connection with FIG. 4 will be followed (i.e., the cell issues a command to the internet resource loader, which in turn causes WinSock to download a file, if there is a need to do so).

As an example, if cell 844 needs to access a remote DNA file (e.g., "DNA-2.SFR"), it asks URL cache 836 to obtain the file. If DNA-2.SFR is not cached, it will be downloaded from a server (which could be in the same server 840 or another server 842)

In a preferred embodiment of the present invention, all the home page DNA files contain a "SFR" extension. Consequently, a run cell is invoked when a user clicks on an icon associated with a downloadable DNA file. This cell performs only one function: to download another DNA file (if not present locally) and associate a corresponding cell (e.g., cell 846) to the DNA file. This newly downloaded DNA file (e.g., DNA-2.SFR) is the real DNA file of interest which contains the application designed by a programmer. In this preferred embodiment, the home page DNA file can be considered a phantom DNA file.

The reason for separating phantom DNA files from the real DNA files of interest is that this arrangement allows users of the DCT technology to review and edit all the DNA files under its control. As explained above, the home page DNA files are cached by browser cache 835. Each browser uses a proprietary cache design, and the files cached therein (e.g., DNA-1.SFR) are generally outside the control of users and DCT. DCT can only control files in URL cache 836. The above arrangement places all the real DNA files of interest (e.g., DNA-2.SFR) in URL cache 836, and thus can be controlled by DCT. As explained above, in one embodiment of the present invention, the cache list and DNA files are written in ASCII form, thereby allowing users to view and edit these files. Consequently, the users have full control over their applications. On the other hand, the files cached in the cache of the browser is generally not accessible by the user or DCT.

Uploading Distributive DNA Files

In one embodiment of the present invention, all the DNA files are ASCII files. Thus, it would be easy for a client computer to develop an application using DCT technology and then send the associated DNA files (and if needed, other files referred to in these DNA files) to a server. Other client computers can then download these DNA files for executing the application.

It should be noted that the servers are used in the present invention as a convenient place to hold files. The present invention does not require the use of a server. For example, a first client computer could send DNA files to a second client computer, and the second computer could execute the application. There is no need to have an intermediate computer (e.g., a server) involved.

The present invention could be used by a group of programmers to develop applications. As explained above in connection with FIG. 2, an application may involve many cells, each associated with a DNA file. The development of these DNA files could be assigned to several programmers working in different client computers. These programmers upload their DNA files to a server. A programmer in the server could integrate these DNA files into a complex application. Alternatively, a programmer in a client computer can download these files and integrate these files. The programmer then upload the integrated application to the server. Client computers in the network can download the DNA files of this complex application and execute it.

Detailed Description of the DCT

Figure 6:
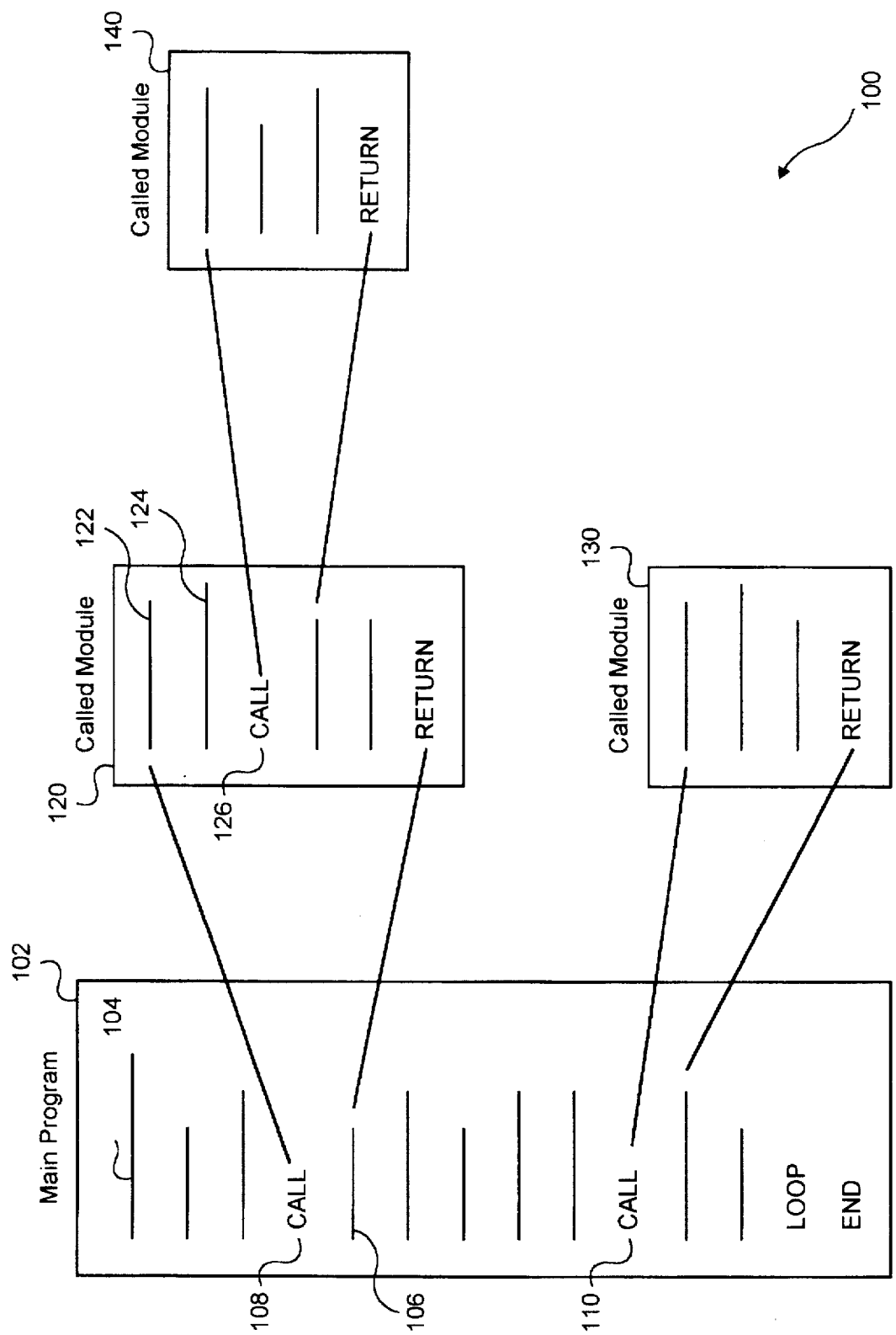
FIG. 6 is a diagram showing a prior art programming architecture.

Conventional computer program architecture consists of a main program and a plurality of program modules. The main program typically controls and coordinates the operation of the program modules. FIG. 6 is a schematic diagram of a program 100 having such an architecture. In FIG. 6, a main program 102 contains a plurality of statements, such as 104 and 106. Some of the statements could be CALL statements, such as statements 108 and 110. These two CALL statements, when executed, will invoke program modules 120 and 130. Main program 102 may contain a LOOP statement which causes main program 102 to execute continuously in a loop. Main program 102 also contains a STOP statement for terminating the program. It should be appreciated that program 100 could be written in different programming languages, and the precise syntax of the statements and program structure could vary with the programming languages.

Program 100 contains a plurality of program modules, such as modules 120 and 130, called by main program 102. Module 120 contains a plurality of statements, such as statements 122 and 124. It could also contain a plurality of CALL statements, such as statement 126. This statement, when executed, will invoke another module 140. Finally, module 120 contains a RETURN statement.

When CALL statement 108 is executed, main program 102 jumps to module 120. Statements 122, 124 and the rest of the program are executed. Upon executing the RETURN statement in module 120, program 100 returns to statement 106, which is the statement following CALL statement 108. At this time, the control of program 100 is returned to main program 102. Main program 102 continues to execute.

The structure of all the modules is similar to that of module 120. Similarly, the jump-return mechanism, described above, is carried out by all the CALL statements in program 100. Consequently, they will not be further described in this specification.

In order to carry out this jump-return mechanism, the return addresses of the CALL statements need to be saved in RAM (typically in a memory structure called a stack). Other essential state information of the computer prior to jumping to the called module, such as values of registers, may also be saved if there is a need to do so (e.g., when jumping to an interrupt service routine). Thus, when main program 102 calls module 120, the contents of these registers may also be pushed (i.e., saved) in the stack. Similarly, when module 120 calls module 140, the return address of module 120 also needs to be saved. The contents of appropriate registers may need to be pushed in the stack. Thus, the size of the stack could be large when a large number of CALL statements are executed.

When a RETURN statement is executed, the return address is used to return to the calling program. The saved information is also retrieved.

Typically, a program in the above described conventional architecture contains many CALL statements and many modules. These modules could call other modules (e.g., module 120 can call module 140), thereby forming a chain of CALL statements. The precise history of this chain needs to be preserved so that the last called module can return to the main program. One of the problems of the conventional architecture is that the time to travel the chain could be very long. As pointed out above, each time a CALL statement is invoked, certain amount of state information needs to be saved, resulting in overhead in execution. Each time a RETURN statement is executed, the saved information needs to be restored, again requiring overhead in execution. As a result, the execution speed of programs written using conventional architecture is slow.

The following are some of the characteristics of the conventional architecture: (a) there is a controlling ("boss") program, e.g., main program 102, (b) all the linkage information (e.g., return address and registers) needs to be preserved when one part of the program (a calling program such as main program 102 or some of the modules) transfers execution to another (the called program), and (c) the linkage information is used to return control and information to the calling program. This architecture could be called a "boss" architecture. The calling module can be considered a master while the called module can be considered a slave executing commands issued by the master and then reporting results to the master.

Recently, other programming architectures have been developed. However, they are also based on the boss architecture. One example is object-oriented programming. This method allows codes to be reused and applications developed relatively rapidly. However, the applications still have a controlling body which adds tremendous overhead.

Advances in program architecture have also been made in operating environments. One example is an interprocess communication protocol called dynamic data exchange (DDE) used in Microsoft's MS Windows environment. DDE uses a shared memory to exchange data between processes and a protocol to synchronize the passing of data. The heart of DDE protocol is the DDE message. A process (client) can ask another process (server) to perform a service. Specifically, the client issues a WM_DDE_EXECUTE message to post a command to the server by storing a command string in a global memory block and passing to the server a handle to the global memory block. The server subsequently returns a WM_DDE_ACK message to the client. If the server successfully executes the command, the WM_DDE_ACK message would return a TRUE value to a DDEACK structure member labelled "fAck." If the command is not successfully executed, the server posts a WM_DDE_ACK message with "fAck" set to FALSE. When the client receives the WM_DDE_ACK message from the server, it deletes the command string from global memory and proceeds to take appropriate actions accordingly.

It is clear that interprocess communication via DDE has many characteristics of the conventional architecture shown in FIG. 6. Specifically, the preservation of linkage information and the return of control to the client are important aspects of DDE. While the architecture of FIG. 6 stores the content of a few registers and the return address in each interprocess communication, DDE uses elaborate commands and data structure. As a result, DDE is even less efficient than the architecture of FIG. 6.

Another example of new developments in operating environment is an architecture used in MS Windows called OLE (Object Linking and Embedding). This architecture allows one application (e.g., a word processor program) to be linked to one or more applications (e.g., a spreadsheet program). In the terminology of OLE, applications can be classified as client applications and server applications. MS Windows uses a "registration database" to maintain a collection of information about OLE applications and file extensions for MS Windows applications. All communication between applications is handled by OLE. Specifically, OLE applications communicate through the use of three dynamic-link libraries: OLECLI.DLL, OLESRV.DLL, and SHELL.DLL. The SHELL.DLL enables applications to communicate with the registration database. The OLECLI.DLL is the OLE client library and the OLESRV.DLL is the server library. The OLE server and client libraries communicate with each other through DDE messages. The typical path of communication for an OLE function includes the call of the function, DDE messages between OLE libraries, and disseminating information to the client and server applications.

In one example, when the OLESRV.DLL library receives notification from the OLECLI.DLL library that a client application needs an object, the OLESRV.DLL library calls appropriate server methods. For example, OLESRV.DLL calls a ServerOpen( ) method when a user activates an object in an OLE client application. The server application then performs the operation of the ServerOpen( ) method. If ServerOpen( ) is performed successfully, the method returns OLE_OK. If ServerOpen( )is not performed successfully, an OLE_ERROR_OPEN is returned. The client application can then take appropriate actions.

The registration database in OLE contains the linkage or history of the applications. The registration database and the client-server structure of OLE form a boss architecture. Further, even a simple communication between applications requires the involvement of many Windows components (e.g., DDE, dynamic-link libraries, etc.). It is well-known that MS Windows applications require a lot of memory and processor bandwidth. The boss architecture together with the complicated structure of MS Windows' components could be one reason for the slow performance.

Figure 7A:
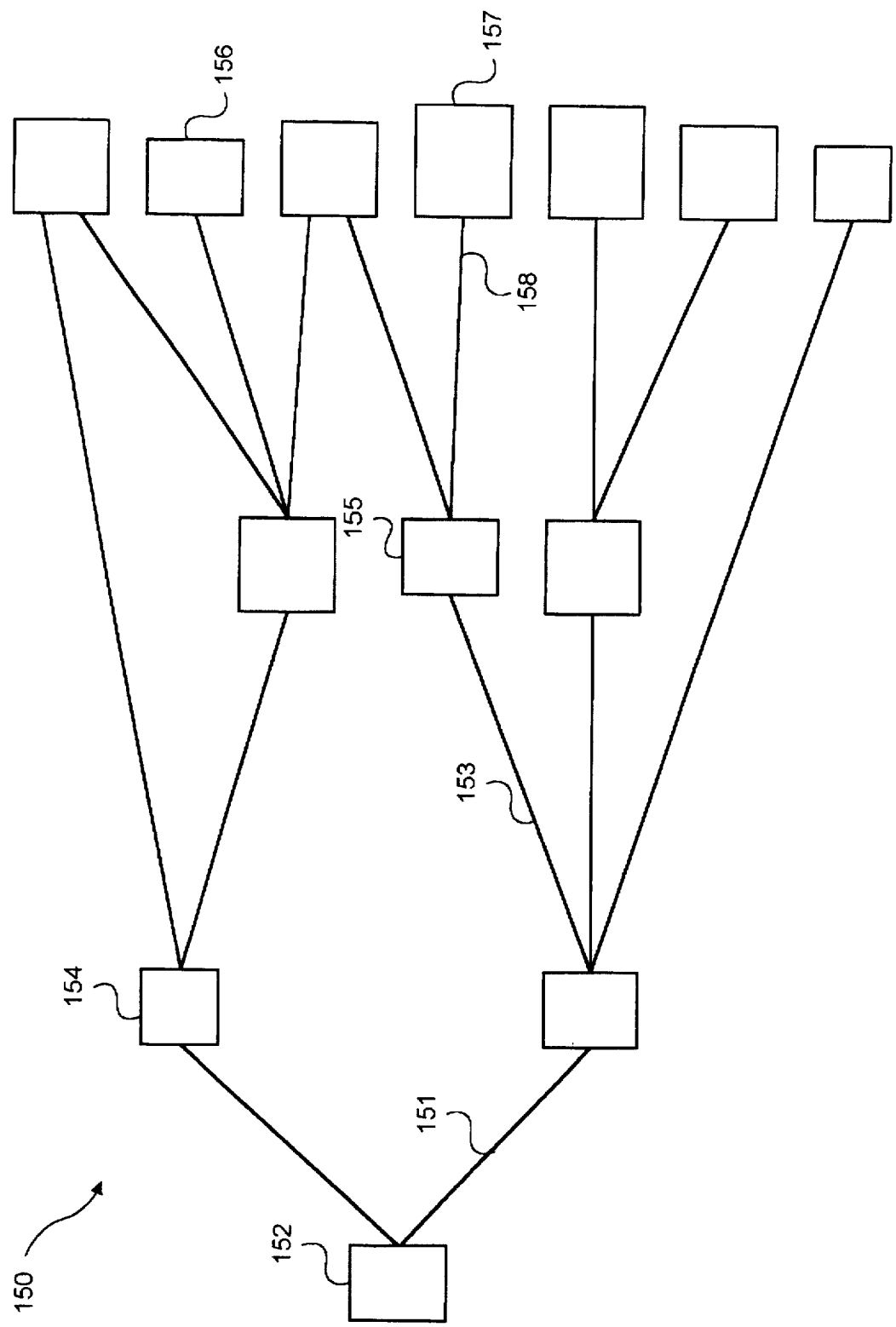
FIGS. 7A and 7B show a comparison between prior art architecture and the architecture of the present invention.
Figure 7B:
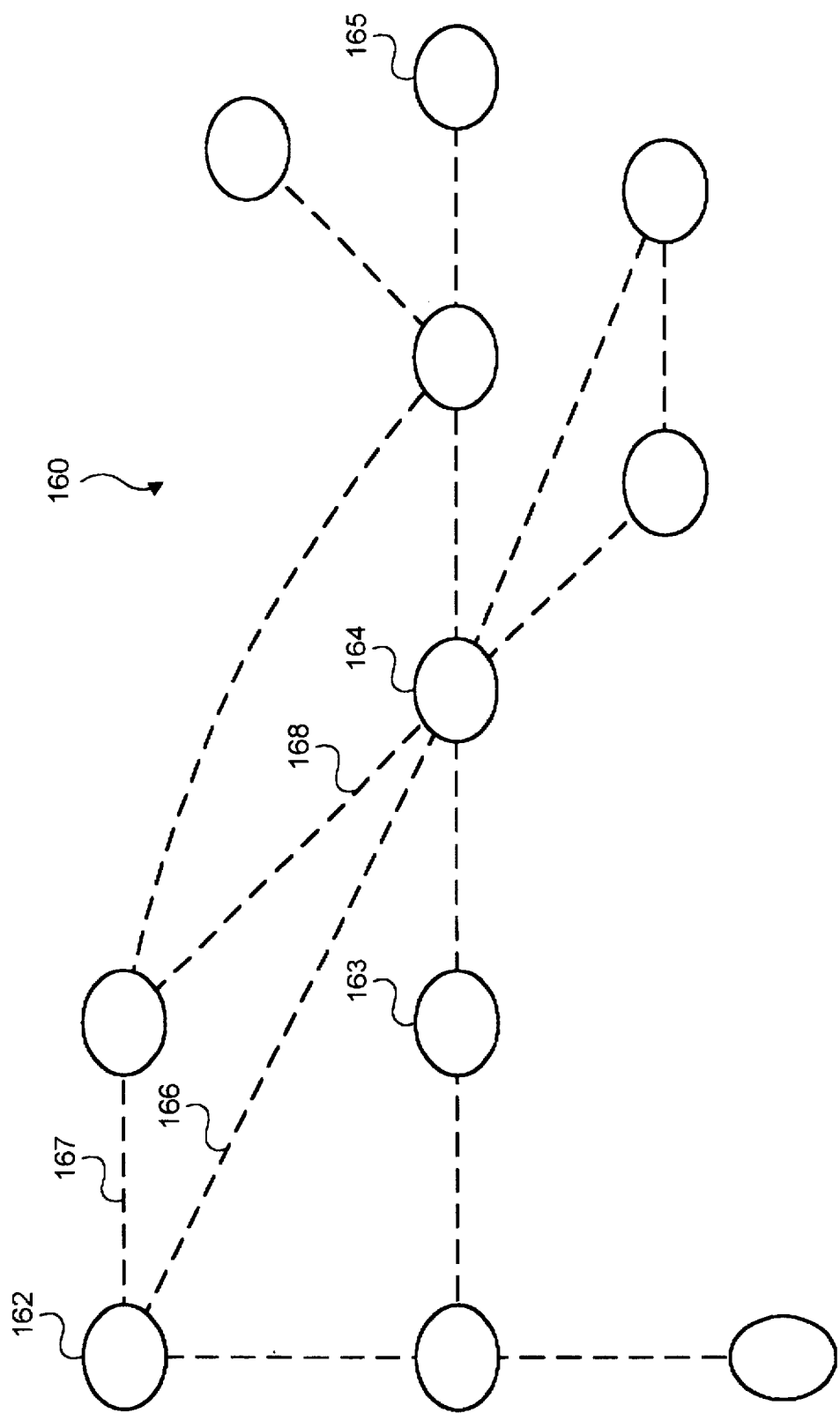

The architecture of the present system is called a "bossless" architecture because every program module is on equal footing with other program modules. There is no module that controls the overall operation of the program (i.e., no boss). A comparison of the bossless architecture and the boss architecture is shown in FIGS. 7A and 7B. FIG. 7A is a schematic view of an application 150 based on the boss architecture. The architecture is in the form of a hierarchic structure, and a boss module 152 controls a plurality of modules, such as modules 154–157. Solid lines running from the boss to the individual modules are used to graphically depict the chains of command and linkage. When a program module in the lowest level (i.e., module 157 at the end of a branch) is executing, solid lines (i.e., links) 151, 153 and 158 from the boss to that program module must be maintained. FIG. 7B is a schematic view of an application 160 based on the present bossless architecture. Application 160 comprises a plurality of program modules, such as modules 162–165. Each program module (called a "cell" in the present architecture) is the same as the other cells in an hierarchical sense. Cells are linked together in a novel way in which no history or linkage information needs to be retained. Each link is independent. For example, there is no need for links to be active simultaneously. Each link is direct, i.e., two cells can be linked directly without the need of using one or more intermediate links. For example, cells 162 and 164 can be linked directly using line 166 instead of using lines 167 and 168 and passing through an intermediate cell. An application can be formed by defining the cells involved and using the novel link of the present architecture. This is different from the situation in FIG. 7A where the link from the boss to the module at the lowest level must be active at all time while the module is executing. In FIG. 7B, dashed lines are used to graphically depict the novel interaction of the present architecture.

Figure 8:
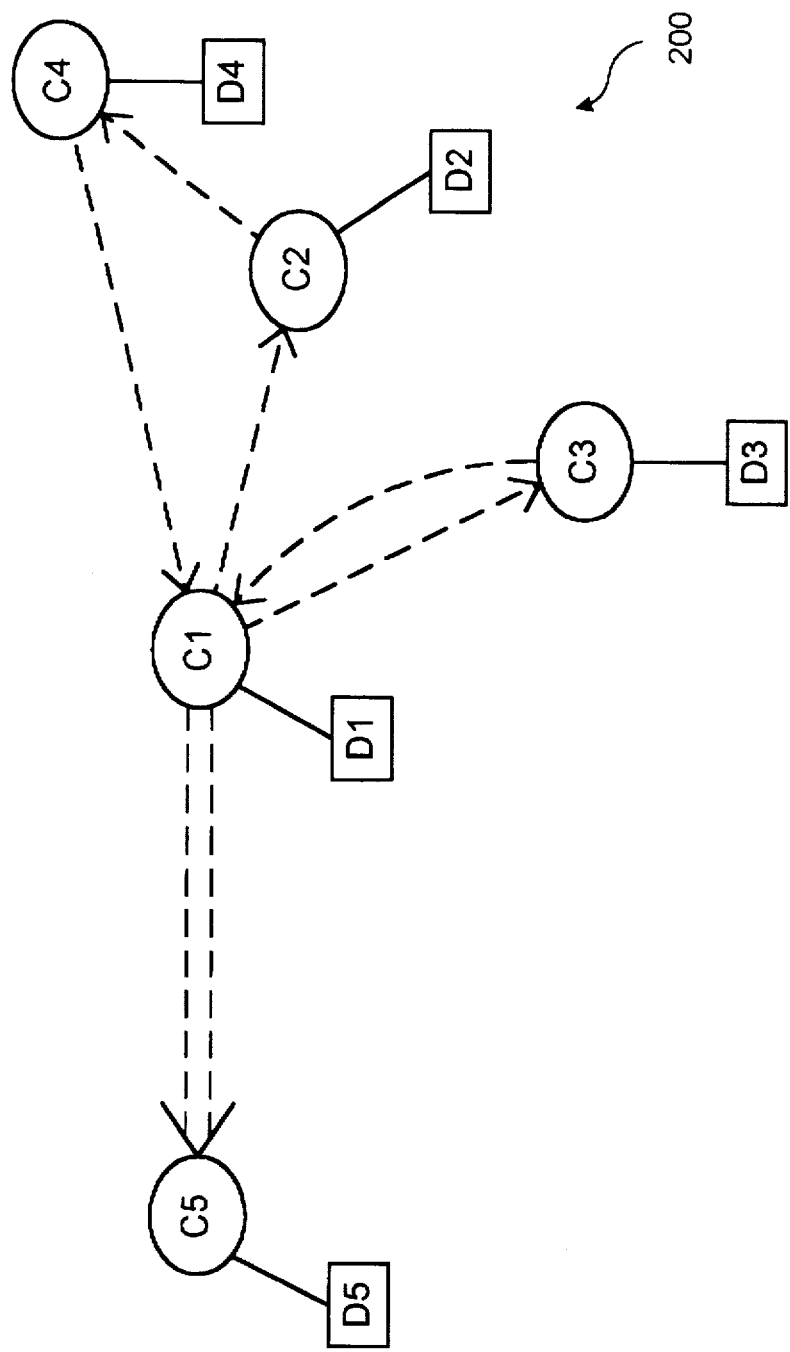
FIG. 8 is a diagram showing the interaction of cells in accordance with the present invention.

FIG. 8 is a drawing showing the structure of an application 200 using the bossless architecture of the present architecture. Application 200 contains a plurality of cells, labeled as C1–C4, loaded and executing in RAM. Each cell has an associated file (labeled as D1–D4), called DNA file, which contains information of the cell. The term "DNA" is used here in analogy with the biological relationship between a living cell and its DNA. At a desired time, cell C1 can send statements (called "DSF statements") to cell C2 using a protocol called digital shifting function ("DSF") protocol. Cell C2 will execute these statements. The detail structures of cells, DNA files and the DSF protocol will be described below.

One important distinction of the present architecture from conventional inter-process communication is that cell C2 does not retain information on the origin of these statements, i.e., no history of the inter-process communication is kept. Thus, once cell C1 completes its writing of DSF statements to cell C2, there is no further linkage between cells C1 and C2. Cell C2 does not know the origin of these statements during their execution. It is possible for cell C1 to later establish communication with cell C2 again by sending another set of statements to C2. However, this communication is separate from the previous communication, and terminates once the new set of DSF statements is sent.

Each of the cells can send DSF statements to any of the cells it desires. Thus, cell C1 can also send statements to cell C3. Similarly, cell C2 can send statements to cell C4, which in turn can send statements to cell C1. Cell C3 can also send statements to cell C1.

In this example, cells C1 and C2 are not bosses to C4. For example, when C4 is executing DSF statements, there is no need to maintain any links between cells C1 and C2 and between cells C2 and C4. Cell C4 has no obligation to report results of execution to any cells in application 200. Links are maintained only during the time DSF statements are transferred. Further, the writing of statements by cell C1 to cell C2 could be independent of the writing of statements by cell C2 to cell C4. In addition, cell C4 merely execute statements, and does not care where the statements come from. In FIG. 8, dashed lines are used to graphically depict the novel relationship between cells.

As pointed out above, one of the problems of the conventional architecture is that excessive amount of linkage information is retained, thereby slowing down the execution of programs. In the present architecture, there is no need to save and restore register values on a stack when cell C2 executes statements written by cell C1. There is no need to register cells in a central database prior to sending commands. There is no need to send messages back and forth to report status of execution. As a result, the application can be executed quickly.

Because there is practically no overhead in linking programs, it is possible to design an application using a large number of small cells. In a preferred embodiment, the size of the cells are small, e.g., typically about 10 kilobytes. The function of each cell is well defined and focused. As a result, there is flexibility in designing applications and the efficiency in execution improves.

A cell can also invoke another cell (e.g., cell C1 can invoke cell C5, as indicated by the double dashed line), if that cell is not already loaded and running in RAM. The invoked cell (i.e., cell C5) could be completely independent of the invoking cell (i.e., cell C1) after invocation. Thus, the invoking cell is not the boss of the invoked cell and the two cells are hierarchically at the same level. This is completely different from the prior art in which an invoking program module is at a hierarchical different level as the invoked program module.

As explained below, a cell can be implemented as an ".EXE" file (in the MS DOS or MS Windows environment), and can be loaded into RAM for execution using well known methods in accordance with the operating environment. The cell's associated DNA file can also be loaded into RAM. The invoked cell takes on the attributes stored in its DNA cell. It is also possible to modify the DNA file when the cell is invoked or while running by writing to the file (which could be an ASCII file). As a result, the architecture provide a flexible approach to build applications.

It can be seen from FIG. 8 that the bossless architecture has a flat structure instead of a hierarchical architecture of FIGS. 6 and 7A. Each of the cells C1–C4 is an independent executable routine which is at the same hierarchical level as other executable routines. No cell functions as a boss for other cells. Consequently, this architecture is called a bossless architecture.

This architecture allows an application to start at any cell. Other cells can be invoked as needed. This architecture also allows an application to end at any cell. Because there is no chain to unwind, the cells can terminate immediately. There is no need to return to the "boss" program before exiting the application. In one embodiment of the present architecture, a cell can exit the application at a predetermined time after invocation of a new cell. In another embodiment of the present architecture, other cells can send a DSF statement to this cell requesting it to terminate.

Figure 9:
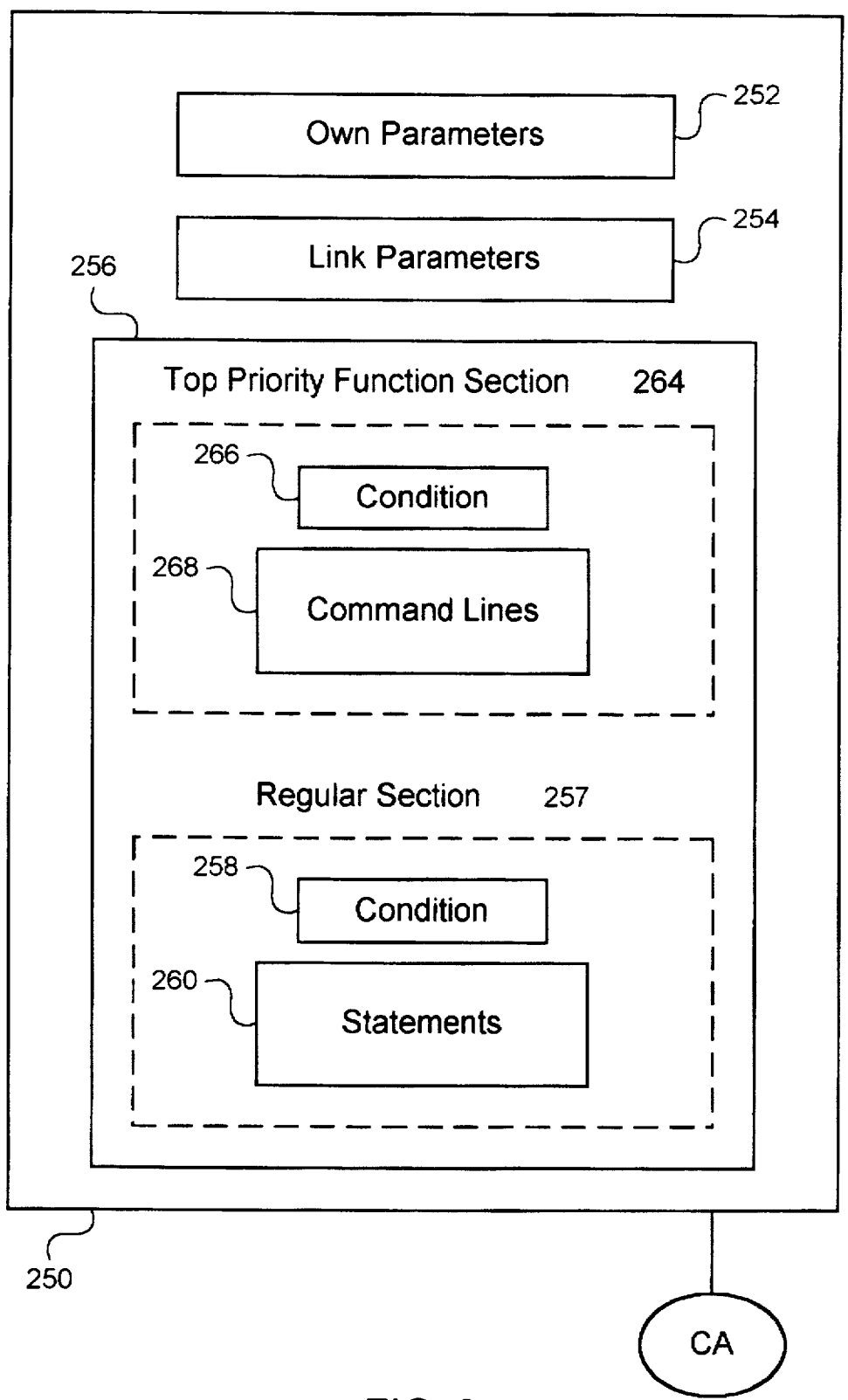
FIG. 9 shows a block diagram of the structure of a DNA file in accordance with the present invention.

FIG. 9 is a block diagram showing the logic structure of a DNA file 250 associated with a cell, such as cell CA. File 250 has a section 252 containing parameters ("own parameters") related to the characteristics of cell CA itself. For example, section 252 may contain parameters related to the way cell CA manifest itself when invoked: the window size and background color of cell CA, the name of cell CA, the names of audio files associated with its invocation and termination, etc.

File 250 also contains a section 254 containing linking parameters ("link parameters") on cells related to cell CA. Examples of the parameters contained in this section are: the names, symbols and positions of the other cells. One of the parameter is "close," which is interpreted as closing cell CA when the cell associated with this parameter is invoked.

File 250 further contains a DSF information section 256. This section contains a regular statements section 257 and a top priority function section 264. The structure of the regular section 257 and top priority function section 264 are substantially the same, except that top priority function section 264 has a higher priority in statement execution. These two sections contain individual headers for identifying the sections (e.g., each section headed by a different name or symbol).

Regular section 257 contains a "condition" section 258 and a statements section 260. Statements section 260 comprises DSF statements sent to cell CA by other cells. Statements in statements section 260 are executed sequentially. Examples of statements are "Draw Circle," "Draw Line," and "Scrolling." Each statement also contains parameters necessary for the execution of the statement (e.g., location and diameter of circles). Condition section 258 comprises three components: (a) a first pointer to the last DSF statement currently existing in statements section 260, (ii) a second pointer to the current DSF statement being processed by cell CA, and (iii) the current status of the cell. Examples of status are: ready, busy, lock, and never.

Top priority function section 264 contains a condition section 266 and a command lines section 268. The structure of condition section 266 is similar to the structure of condition section 258 (e.g., both sections contain two pointers). Command lines section 268 contains executable command lines which are sent by other cells using DSF (or similar) protocol. The command lines have a higher execution priority than the statements in statements section 260 (the details of execution priority will be discussed below in connection with FIG. 10). The command lines in command lines section 268 are executed sequentially. Examples of commands in section 268 are close, min (for minimizing a window), max (for maximizing a window), restore, etc.

It should be appreciated that the logic structure shown in FIG. 9 can be implemented using one or more physical files. Further, portions of the logical sections may intermingle physically. In one embodiment of the present architecture, the DNA file is a text file. Thus, the content of the DNA file can be modified by using a regular text editor.

Statements sent by one cell to another follow the DSF protocol. A sending cell (e.g., cell CS) sets up a communication link with the DNA file 250 associated with cell CA. Specifically, it looks up the address of DNA file 250 and determines whether DNA file 250 is able to accept DSF statements (e.g., at a "ready" state) by examining its status in condition section 258. Statements will be issued by cell CS only when cell CA is ready to accept them. In one embodiment, the issuance of statements involves writing ASCII characters (e.g., the ASCII characters for "Draw Circle") to statements section 260 of DNA file 250.

When cell CS is authorized to issue statements to cell CA, cell CS reads the first pointer (in condition section 258) to the last DSF statement to determine the appropriate address to write the DSF statements. It is important not to overwrite DSF statements already existed in cell CA. Cell CS writes DSF statements to statements section 260 of DNA file 250. Cell CS also updates the first pointer in condition section 258 so as to point to the last DSF statement newly written into statements section 260. The communication link between cells CA and CA is terminated. It can be seen that cell CA and DNA file 250 do not maintain record (i.e., history) indicated that these new statements originate from cell CS.

It should be appreciated that the above described DSF protocol is only an exemplary protocol. Other protocol could be used to write DSF statements to cells. For example, different pointer structures can be used, e.g., the first pointer can point to the position after the last DSF statement. Different types of status and different ways for checking status information can be used. Further, the statements could be stored in accordance with a logic structure instead of stored physically in a sequential manner. For example, the statements could be organized into groups with the address of each group pointed to by a pointer.

Command lines are sent by one cell to another using a protocol substantially the same as the DSF protocol. Because regular statements section 257 and top priority function section 264 have different headers, the sending cell can distinguish between these two sections and write to the appropriate section. Other means for identifying these two section cam also be used (e.g., maintaining separate linked lists of statements and command lines).

Because DSF statements/commands are executed sequentially (either physically or logically), cell CA needs to complete execution of statements/commands (if any) preceding the above mentioned statements/commands written by cell CS. This set of previously written statements/ commands are likely to be written by other cells (although it is also possible that it is written by cell CS in a prior communication link).

After the set of previously written statements/commands has been executed and prior to the execution of the statements/commands written by cell CS, cell CA does not have to take any action with respect to the cell which wrote the first set of statements/commands (e.g., no "return" is needed). This aspect of the present architecture is different from conventional programming architecture.

Note that the communication link between cells CA and CS can be terminated prior to the execution of the first statement/command sent by cell CS (for example, the previously written DSF statements/commands have not yet be executed completely when cell CS finishes sending DSF statements to cell CA). This is different from conventional linking in which communication link between two program modules is completed only after the task relating to these two modules is executed completely.

In a different embodiment of top priority function section 264, command lines section 268 allows only one command.

In this embodiment, there is no need to have pointers. Thus, condition section 266 can be removed from top priority function section 264. Other cells can write a single command to top priority function section 264 because this section is separated from other sections by a header.

Figure 10:
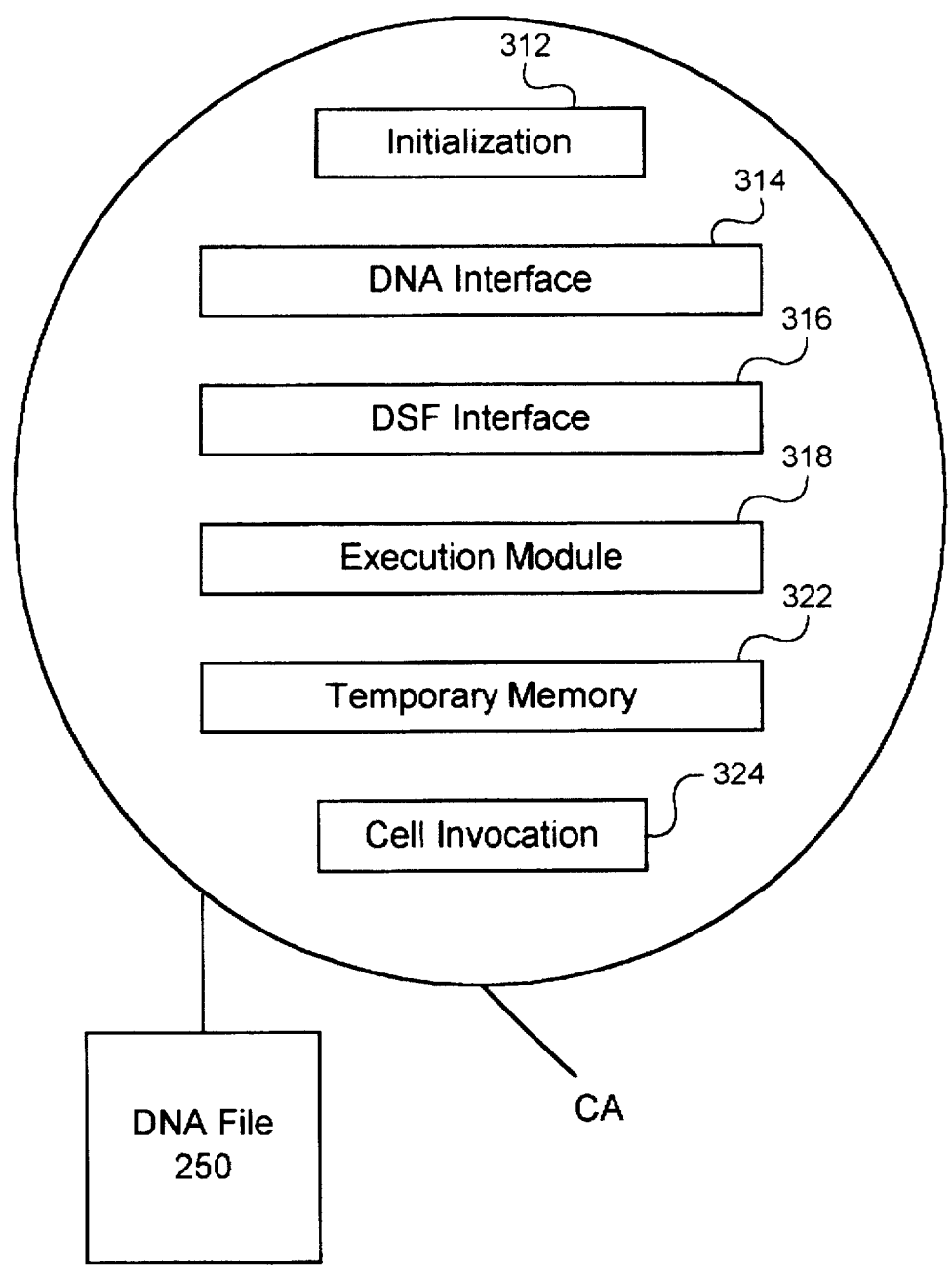
FIG. 10 shows a block diagram of the structure of a cell in accordance with the present invention.

FIG. 10 shows the structure of cell CA. It is grouped logically into a plurality of sections, each implemented using instructions executable by a computer. Cell CA contains an initialization section 312 and a DNA interface section 314. DNA interface section 314 allows cell CA to read from and write to its corresponding DNA file 250. Initialization section 312 takes care of housekeeping tasks when invoked, including reading parameters from "own parameters" section 252 of DNA file 250. Cell CA also contains a section 316 for processing DSF protocol. This section contains code (or program instructions) for sending and receiving statements/command lines using the DSF protocol.

Cell CA contains an execution section 318 containing code for automatically executing statements and command lines in DNA file 250 written by other cells. The code sequentially read and execute statements in statements section 260 of DNA file 250. After each statement is executed, cell CA branch to top priority function section 259 and executes all the command lines therein. Cell CA then executes the next statement in statement section 260.

An example is used to illustrate the execution steps. In this example, statements section 260 contains two statements, "Draw Circle" and "Draw line," while the top priority function section 259 contains one command line, "Max". When cell CA reads a "Draw Circle" statement and its associated parameters, the code will perform a graphic algorithm for drawing a circle at an appropriate place with an assigned diameter (as determined by the associated parameters). Cell CA then branches to top priority function section 259 and executes the "Max" command, which causes a window associated with cell CA to enlarge. Cell CA returns to statements section 260 and executes the next statement, i.e., the "Draw Line" statement. Cell CA executes a graphic algorithm which draws a line in accordance with the parameters associated with the "Draw Line" statement.

In the above example, if the command line in top priority function section 259 contains a "Close" command, cell CA will close itself. In this situation, the "Draw Line" statement will not be executed.

In one embodiment of the present architecture, cell CA reads statements section 260 at predetermined times regardless whether statements are present in DNA file 250 (i.e., similar to a polling arrangement). In another embodiment of the present architecture, a cell sends a signal to cell CA, either directly or indirectly (e.g., through an operating system), after sending statements to DNA file 250. Upon receiving the signal, cell CA executes the statements in statements section 260 until all the statements have been executed. Cell CA then waits for another signal. This embodiment is similar to an interrupt arrangement. Thus, the execution of statements is carried out automatically in both embodiments.

Cell CA contains a temporary memory section 322 for storing temporary information. As an example, it is possible to change attributes (e.g., background color and the size of the display window) of cell CA during its execution. In one embodiment of the present architecture, the changed attributes are temporarily stored in temporary memory section 322 instead of immediately being written to DNA file 250. In this embodiment of cell CA, the attribute information stored in temporary memory section 322 is written into "own parameters" section 252 of DNA file 250 only when cell CA is terminated.

Cell CA also contains a cell invocation section 324 for invoking other cells. In one embodiment of the present architecture, this section obtains information about the cell desired to be invoked and pass this information to a specialized cell which actually invoke the desired cell. It is also possible to incorporate the functionality of this specialized cell in the cell invocation section of cell CA and other cells.

It should be appreciated that the above mentioned sections in cell CA are grouped logically, and portions of these sections could intermingle physically.

It can be seen from the above described structures of cell CA and its associated DNA file 250 that both cell CA and DNA file 250 do not keep track of the origin of the DSF statements. A cell may accept DSF statements (stored in its associated DNA file) from many cells. After the DSF statements have been received, the linkage between the originating and destination cells is terminated. The cell executes DSF statements contained in its associated DNA file without knowledge of how the statements arrive the DNA file. As a result, there is no need to "return" to any cell.

Typically, the size of each cell is small and the function of the cell well defined. Consequently, the execution speed is fast. As a result of the small size and specialized function, the cells can be easily written to fully utilize the resources of a computer. The communication between cells using DSF is direct, with minimum amount of access to the operating system on which an application is run. As a result, the efficiency is high.

The present architecture comprises at least two cells which can communicate with each other. The cells are encapsulated program modules that are specialized for their designed tasks. Therefore, applications developed using the present architecture comprise of multiple executables which can run independently or concurrently. The cells interact with each other using the inventive DSF protocol. Each cell can control the action of other cells. For example, a first cell can control a second cell, and the second cell can control the first cell. Therefore, no single cell has complete control over the other cells, or in other words, there is no boss. On the other hand, under conventional architectures, program modules subordinate to a boss cannot control the boss. Another unique characteristic of the present architecture is that the cell that receives a command does not keep any information of where the command came from. This lack of historical knowledge allows cells to move forward instead of going backward in a link.

The technology of the present system is called the "digital cell technology" because the structure of program modules and the interaction between them are similar to biological cells. Some of the similarities are listed here: (i) an application is made up of many cells dynamically interacting with each other, (ii) many cells can be active at a time, (iii) the interaction of a pair of cells can be independent of interaction of other pairs of cells, (iv) control is distributed instead of centralized, and (v) each cell is associated with a DNA structure which guides the behavior of the cell.

One of the embodiments of the present architecture is a multimedia application development system which runs under Microsoft's MS Windows. In this environment, cells are programs stored as ".EXE" files and typically show a window on a computer monitor when invoked. By linking these cells, a user can construct an application software just like assembling blocks. Each cell, with its specific function, is given another function or value through DSF protocol with other cells to produce a variety of applications.

Figure 11:
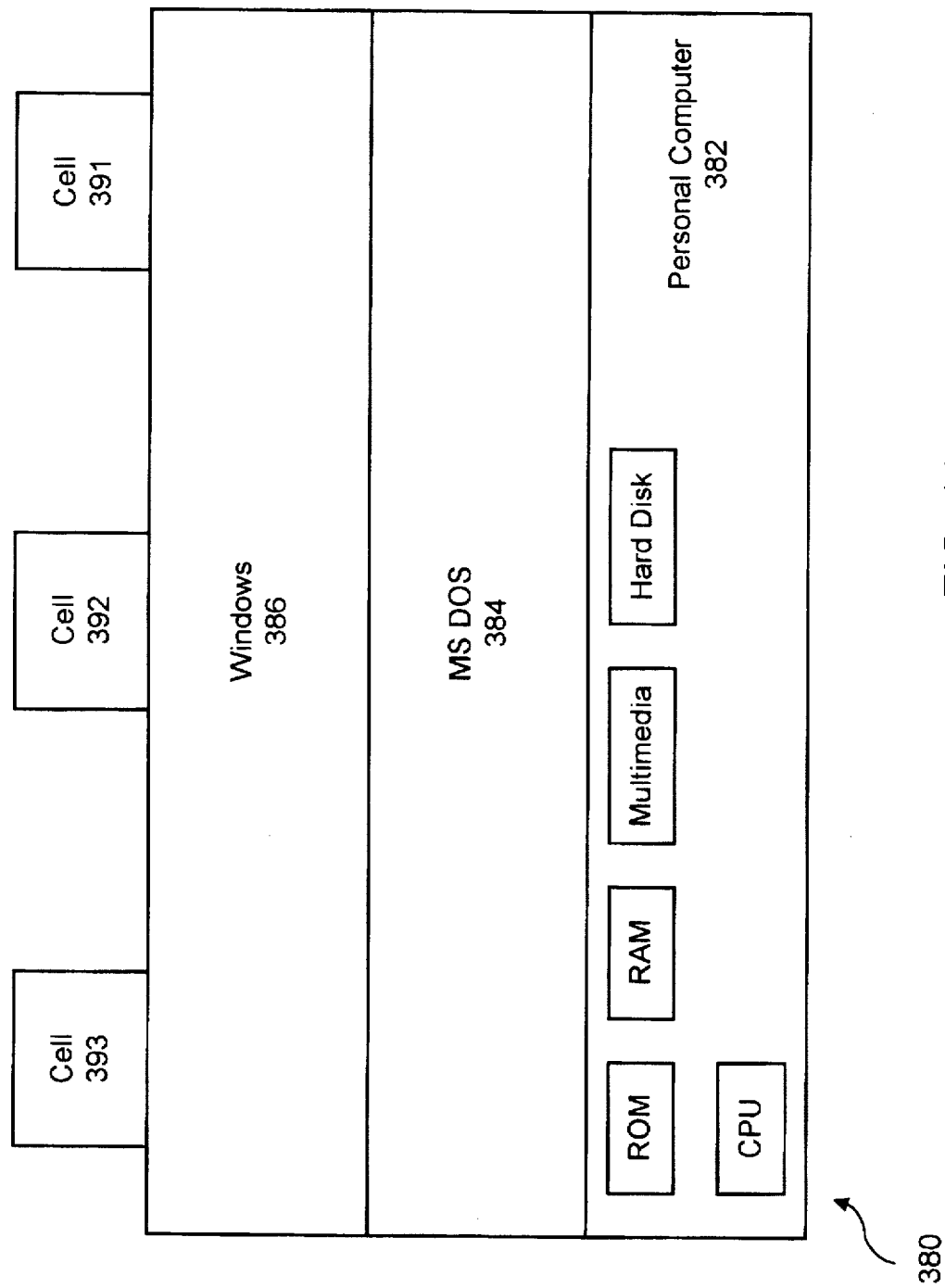
FIG. 11 is a block diagram of a computer system running an applications in accordance with the present invention.

FIG. 11 shows a block diagram of a computer system 380 running the above described application development system. Computer system 380 comprises a personal computer 382, such as an IBM compatible computer. Personal computer contains components such as a CPU, RAM, ROM, hard disk and multimedia device (e.g., sound card, CD-ROM reader, video card, etc.). Personal computer is loaded with a MS-DOS 384 and a MS Windows 386. Cells 391-393 of the present architecture run on top of MS Windows 386. Some of these cells can be graphically displayed on a display device and played on a sound card of personal computer 382.

An exemplary list of cells which run under MS Windows environment together with a description of their functions is given below:

| NAME | DESCRIPTION |
| --- | --- |
| BUTTON: | Creates buttons with action attributes assigned to them. |
| VIDEO: | Enables video file (AVI) playback. |
| CONTENTS: | Displays text files (TXT) (text editor with ability to adding action attributes to the text). |
| VISUAL: | Enables display of BMP, DXF, TIFF, WRI, and TXT files with dynamic 360-degree free scrolling, multiple layer support, raster and vector overlays, and object overlays with action attributes assigned. |
| NAKAMA: | Enables more than one VISUAL cells to be linked using coordinates. Enables images in two VISUAL cells to be interlocked using an interlinked window (bird's eye view). |
| RUN: | DNA file editor and DNA file executor. Enables continuous reproduction of applications. This cell serves as the specialized cell, mentioned above, for invoking other cells. |
| COPY: | Performs file copying. |
| TITLE: | Executes Title Bar functions. |
| RESTART: | Provides user selection to exit or restart the operating system. |
| PLAYWAV: | Enables sound file (WAV) playback. |
| AREA: | Manipulates the attributes of graphics written in the VISUAL cell. |
| LIST: | Enables objects/layers to be grouped and provides instant access to the defined grouping. |

These cells are stored in memory (e.g., floppy and/or hard disk) as ".EXE" files. To effectively allocate system resources for simultaneous activation of more than one cell, the sizes of most cells are around 10 kilobytes. The exception is the VISUAL cell which is about 100 kilobytes.

A simplified example will be used to illustrate the system. Only one type of cell, the visual cell, described above, is used in this example. In this example, the system makes use of the resources of MS Windows. For example, the invocation of a cell (e.g., loading of an appropriate file as a result of clicking on an icon) and the graphic user interface (e.g., the manipulation of windows such as resizing, drag and drop, etc.) are handled by MS Windows.

The multimedia application development system needs to be installed in MS Windows. The installation involves loading files of bitmaps, cells, sound, video, etc. from removable storage media (e.g., floppy, CD-ROM, etc.) to appropriate directories in the hard disk of the computer. Programs are linked to MS Windows and icons are placed at appropriate positions. Thus, a user can invoke the development system by clicking on an icon under MS Windows. Once the development system is running, various cells can be invoked by clicking on icons associated with the cells.

Figure 12:
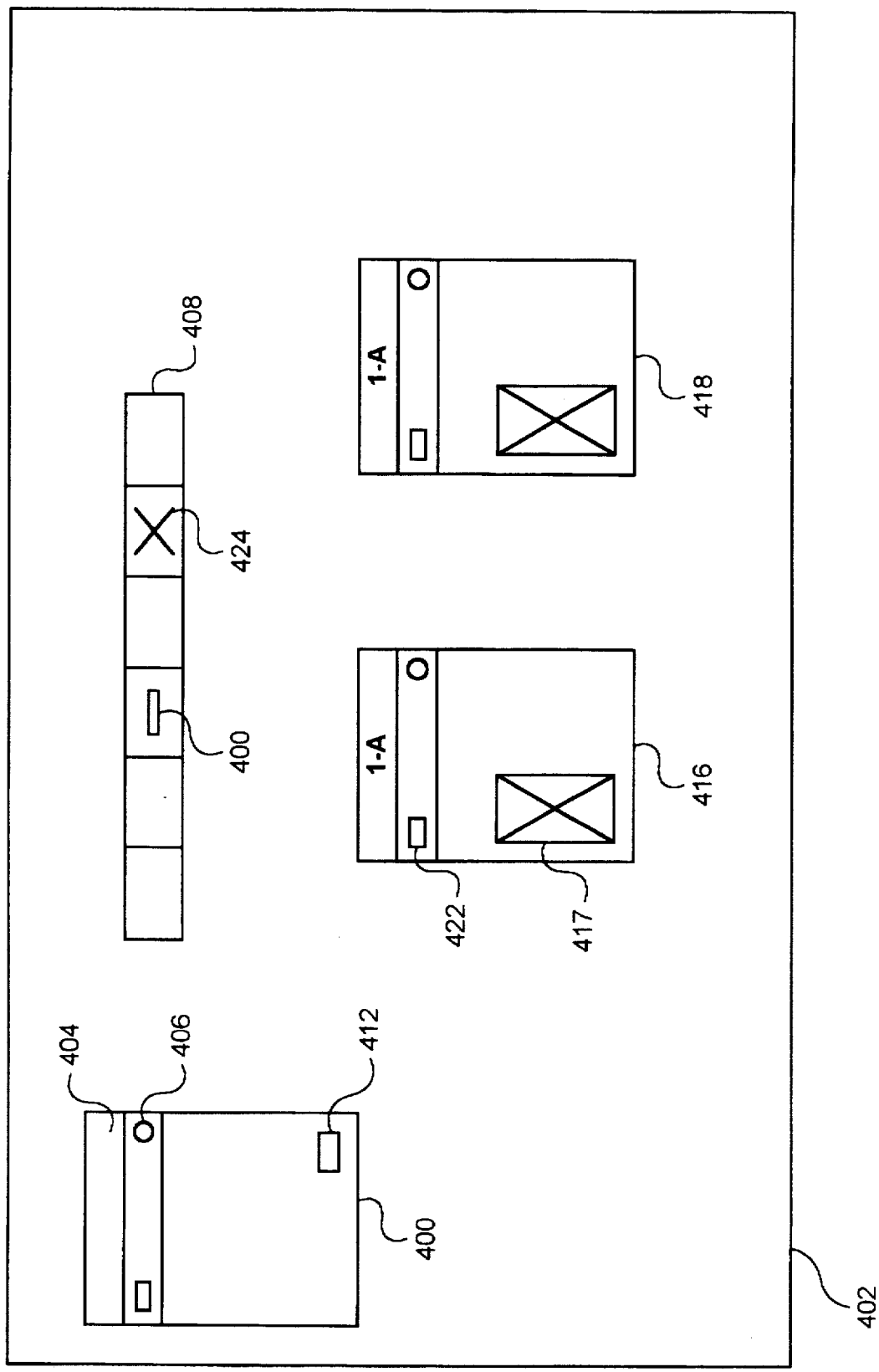
FIG. 12 shows various windows associated with visual cells during the execution of a multimedia development system in accordance with the present invention.

FIG. 12 shows a window 400 representing a first visual cell displayed on a display screen 402 under the control of MS Windows 386. Window 400 typically contains a graphic image (not shown) and a title bar 404. A user can click on an icon 406 in windows 400, and a side bar 408 is displayed. Side bar 408 contains spaces for displaying icons allowing the user to add functionalities to the first visual cell associated with window 400.

One of the spaces of side bar 408 contains an icon 410 for allowing a user to attach an icon for invoking a second visual cell to window 400. After the user clicks on icon 410, a symbol helps the user to place an icon 412 inside window 400 for representing the second visual cell. A window 430, shown in FIG. 13, then appears which allows the user to define the characteristics of the second visual cell. Side bar 408 also contains an icon 424 which allows the user to delete a visual cell placed inside window 400.

Figure 13:
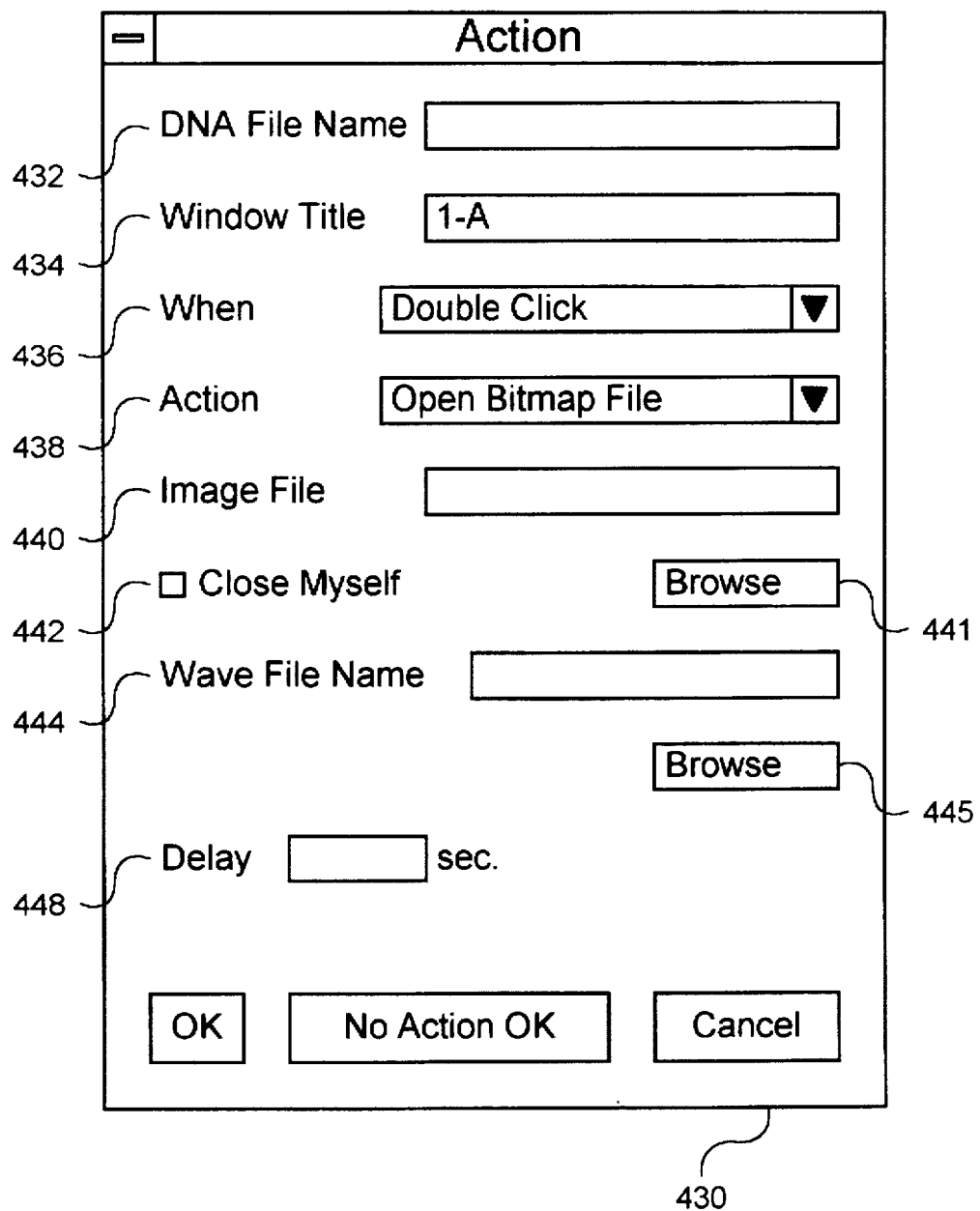
FIG. 13 shows a windows for a user to enter information to a DNA file of the present invention.

Window 430 contains a line 432 for the user to enter the name of a DNA file associated with the second visual cell. The information entered in window 430 will be stored in this DNA file. Window 430 also contains a line for the user to enter the title of a graphic window showing the second visual cell. In FIG. 13, the title "1-A" is entered in line 434. A line 436 allows the user to select the mode of invoking the second visual cell. In window 430, "double click" is selected, indicating the second visual cell is invoked upon double clicking on icon 412.

Window 430 contains a line 438 allowing the user to define the action of the second visual cell. In FIG. 13, the action selected is "open bitmap file." Thus, the action performed by the second visual cell is to open a bitmap file. A line 440 allows the user to enter an image file to be opened when the second visual cell performs its action. Window 430 contains a "browse" button 441 so as to allow the user to search for image files already stored in the computer for the purpose of entering an appropriate file in line 440. Window 430 also contains a "close myself" box 442. When selected, the first visual cell will be closed automatically when the second visual cell is invoked. This is implemented by attaching a "close" parameter to a line in the linking parameter of the DNA file associated with the first visual cell which links the first and the second visual cells.

In this embodiment, lines 440–442 are associated with the action line 438. If the action selected is "close visual cell" instead of "open bitmap file," lines 440 would be changed to allow the user to enter the DNA file of a visual cell selected to be closed after invocation of the second visual cell. In this embodiment, the second visual cell sends a "quit" DSF statement to the designated visual cell after invocation for the purpose of closing that cell.

It is possible to use window 430 to input a variety of actions to be performed by the second visual cell. The two examples above are for illustrative purposes only.

Window 430 contains a line 444 which allows the user to enter an audio file associated with the invocation of the second visual cell. Window 430 contains a "browse" button 445 so that the user can search for audio (typically having an extension of "WAV") files already stored in the computer for the purpose of entering an appropriate file in line 444.

Window 430 contains a line 448 allowing the user to enter a delay. This parameter allows the second visual cell to manifest itself a predetermined time interval after icon 412 is clicked on.

It should be appreciated that the format of and information requested by window 430 is exemplary. Depending on the design objective and creativity of a programmer, window 430 could have other formats and request different types of information. When window 430 is closed (after all essential information has been entered by the user), the information contained therein is stored in the DNA file indicated on line 432. In this embodiment, the DNA file is an ASCII text file stored in the hard disk.

When a user clicks on icon 412, a window 416 is opened to represent one instance of the second visual cell. Window 416 has characteristics defined by its associated DNA file. For example, window 416 contains the title "1-A" (as determined from line 434 of window 430) and a graphic image 417 associated with the image file defined in line 440. The position of window 416 can be moved around using normal MS Windows methods (i.e., drag and drop). When a user clicks on icon 412 again, another window 418 of the second visual cell appears simultaneously with window 416. In this case, two copies of the second visual cell are loaded into the RAM, each is associated with the same DNA file.

It is possible to terminate the first visual cell while the second visual cell is active. In FIG. 2, each visual cell window has a "close" button, such as button 422 in window 416, for allowing the user to close the window. In the development system shown in FIG. 12, the user can close window 400 associated with the first visual cell while windows 416 and 418 continue to be active on display screen 402.

It is also possible to close window 400 using a statement issue by the second visual cell. As explained before, line 438 of FIG. 13 can be set to "close visual cell" and the name of the visual cell is set to the first visual cell. When the second visual cell is invoked, it will send a DSF statement to the DNA file associated with the first visual cell for the purpose of closing the first visual cell.

Figure 14:
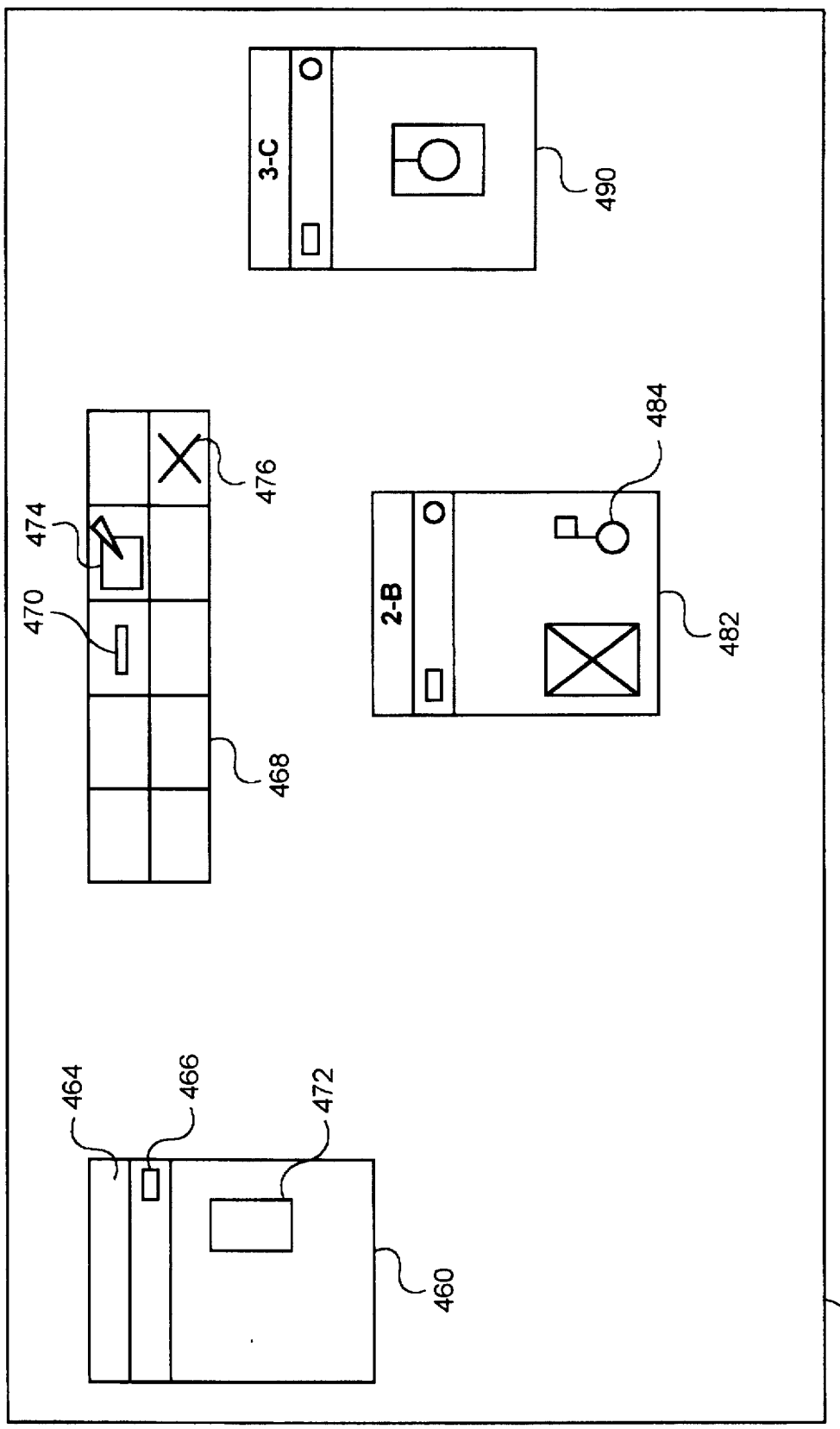
FIG. 14 shows various windows associated with a button cell and visual cells during the execution of a multimedia development system in accordance with the present invention.

An example showing two cells of different types, a visual cell and a button cell, is described below. FIG. 14 shows a window 460 representing a button cell displayed on a display screen 462 under the control of MS Windows 386 of FIG. 11. Window 460 contains a title bar 464. A user can click on an icon 466 in window 460 and a side window 468 is displayed. Side window 468 contains spaces for displaying icons allowing the user to add buttons to, and remove buttons from, window 460.

One of the spaces of side window 468 contains an icon 470 for allowing a user to attach a button to window 460. After the user clicks on icon 470 in side window 468, a symbol appears to help the user to place a button 472 at a desired position inside window 460. This new button can later be clicked on by the user and a sequence of user-defined activities will occur. Side window 468 also contains an icon 476 which allows the user to remove an existing button inside window 460.

Figure 15:
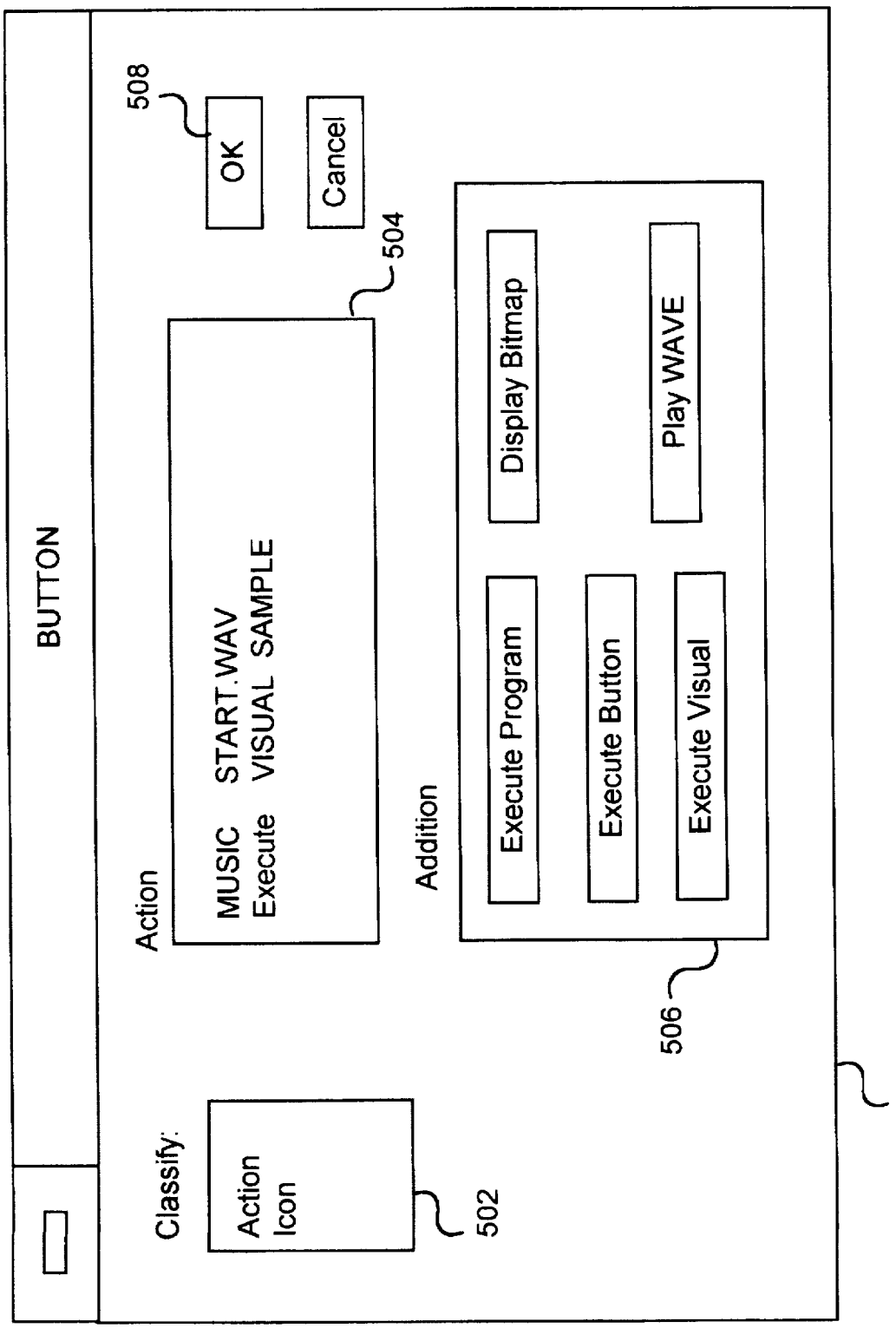
FIG. 15 is a window showing the format for a user to specify a button in accordance with the present invention.

The user can then click on another icon 474 in side window 468 which opens a windows 500, shown in FIG. 15, allowing the user to define the characteristics of button 472. Window 500 contains an area 502 showing a list of items for allowing the user to select the types of information to be entered into window 500. For example, selection of "action" allows the user to enter the actions to be taken by button 472 when it is invoked while selection of "icon" allows the user to choose an icon to represent the button cell instead of using a simple rectangular button. The list may contain other items. Depending on the choice of item in the list, the appearance of, and information requested by, window 500 will be different.

In list 502, "action" is selected. As a result of such choice, an "action" window 504 and "addition" window 506 are displayed. Action window 504 shows the actions of button 472 when invoked. The content of action window 504 is selected by user using addition window 506.

Figure 16:
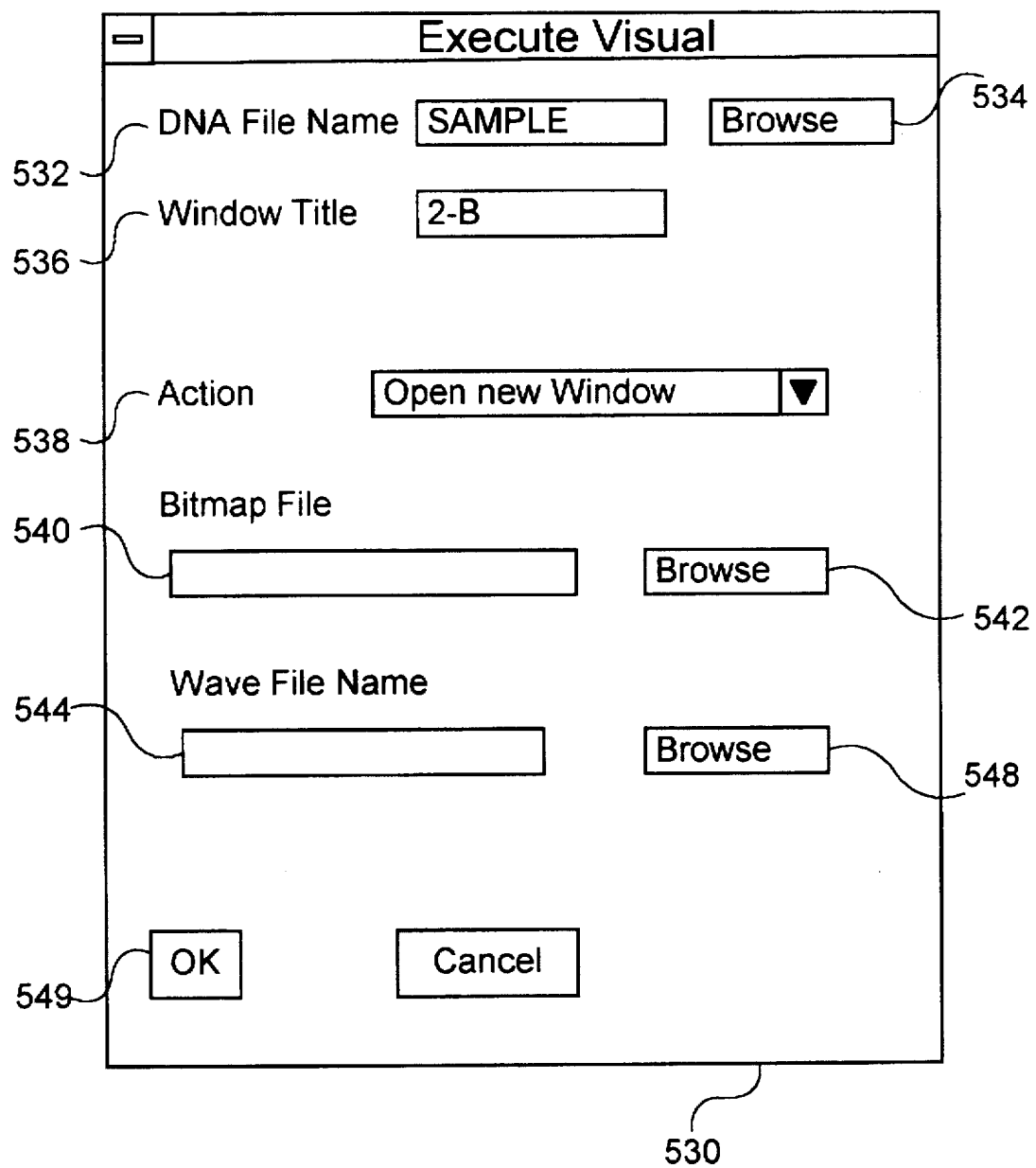
FIG. 16 is a window showing the format for a user to specie a visual cell associated with a button cell in accordance with the present invention.

Addition window 506 contains a plurality of actions, such as "execute program," "execute button," "execute visual," "play wave," and "display bitmap." The user can click on any one of these actions and a window for allowing the user to further define the action will be displayed. An example of such a window for "execute visual" is shown in FIG. 16. The user can select one or more actions in addition window 506.

The selected action is displayed on action window 504. For example, action window 504 contains a line "MUSIC START.WAV" indicating that the "play wave" action in addition window 506 has previously been selected. A window associated with "play wave" (not shown) allows the user to indicate that an audio file named "START.WAV" should be played. Action window 504 also contains a line "EXECUTE VISUAL SAMPLE" indicating that the "execute visual" action in addition window 506 has previously been selection. When the user clicks on an "OK" button 508, the information entered in window 500 is stored in a DNA file associated with this button cell.

The specification of visual cell SAMPLE is now described. A window 530 of FIG. 16 shows the type of information requested upon selecting the "execute visual" action of addition window 506. Window 530 contains a line 532 for the user to enter the DNA file of the visual cell desired to be invoked. In this case, the name is "SAMPLE" which corresponds to the "Execute VISUAL" line in action window 504. Window 530 contains a "browse" button 534 in case the user needs to find a list of preexisting DNA filename. Window 530 also contains a line 536 for the user to enter the title of the visual cell window. In this case, the title is "2-B." Window 530 contains a line 538 for allowing the user to enter the action desired. Examples of actions are "open new window," "open new vector," "open new movie," etc. The content of the next line in window 530, line 540, depends on the selection in line 538. In this example, line 540 allows the user to enter the name of a bitmap file because the action in line 538 is "open new window." If the action in line 538 is "open new vector" or "open new movie," line 540 will request the name of a vector file or a video file, respectively. Window 530 contains a "browse" button 542 allowing the user to find a desired preexisting bitmap file. Window 530 contains a line 544 allowing the user to enter an audio file when the visual cell is invoked. Window 530 contains a "browse" button 548 allowing the user to select a desired preexisting WAV file. When the user clicks on an "OK" button 549, the information entered in window 530 will be used to specify the selected visual cell associated with button 472. This information, along with the rest of the information entered in window 500, will later be stored in the DNA file of button 472.

When all the information relating to button 472 has been entered and stored, button 472 can be invoked. Returning now to FIG. 14, side window 468 can be removed by clicking on icon 466. Removing side window 468 changes window 460 from an edit mode (for allowing users to add, modify and remove buttons) to an active mode (for allowing users to invoke buttons in window 460). In this embodiment, button 466 acts as a toggle for displaying and removing side window 468. After side window 468 is removed, the user can click on button 472 to invoke its associated actions: play a piece of music and display a window 482 corresponding to visual cell SAMPLE. The title of SAMPLE's window is "2-B", which corresponds to line 536 of FIG. 16. In this example, window 482 contains an icon 484 which allows another visual cell to be invoked. This icon 484 has been previously placed in visual cell SAMPLE in a manner similar to the operation discussed above in connection with FIG. 12. The user can click on icon 484 to display another window 490 corresponding to a different visual cell.

It should be appreciated that the format of and information requested by windows 500 and 530 is exemplary. Depending on the design objective and creativity of a programmer, windows 500 and 530 could have other formats and request different types of information.

Another example of an application running under the system of FIG. 11 is a hotel index system displayed on the screen of a computer. The application can be formed by assembling a collection of cells. Any of the cells can be invoked first. For example, a user of the application can invoke (e.g. by clicking on) a cell which is designed to show a window containing the index. Another cell becomes active when a user clicks on an item in the index window. This new cell display itself as another window that shows a regional map. The user can click on an item on the map window to activate a third cell, which includes text or pictures in its display. In this way, more than one cell is active simultaneously, creating an application program.

Figure 17:
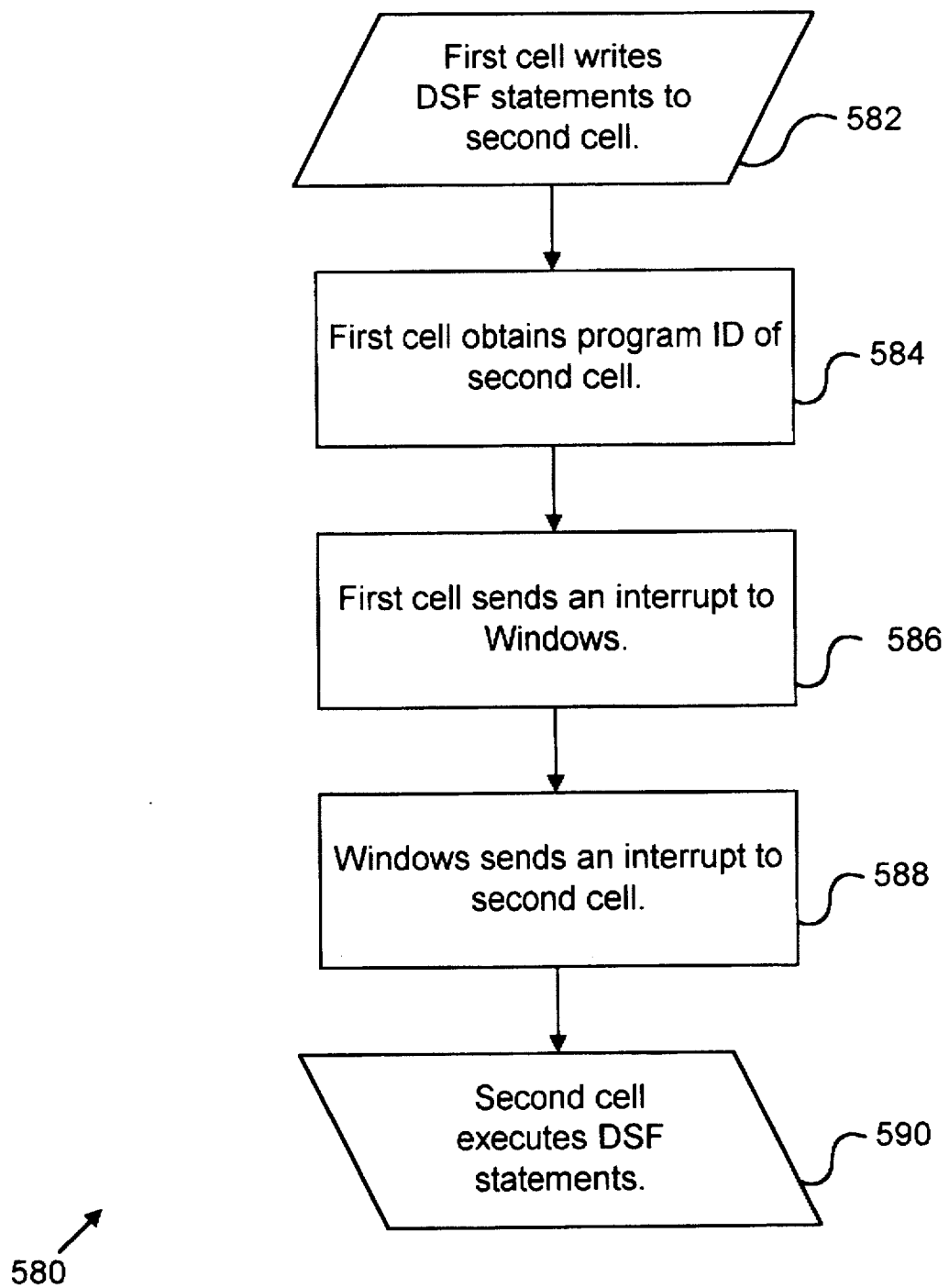
FIG. 17 is a flow chart showing a cell notification procedure in accordance with the present invention.

As mentioned above, in one embodiment of the present architecture, a cell can indirectly notify another cell after writing DSF statements thereto. FIG. 17 is a flow chart 580 showing an embodiment of indirect notification of cells. In this example, MS Windows 386 of FIG. 11 assigns a program identification to each program (including the cells) running on it. After a first cell writes a set of DSF statements to a DSF file of a second cell (step 582), it obtains the program identification of the second cell (step 584). The first cell sends an interrupt to MS Windows 386 requesting it to send an interrupt to the second cell (step 586). In response to this request, MS Windows 386 sends an interrupt to the second cell (step 588). The second cell then executes the DSF statement previously written to its associated DNA file (step 590).

It should be appreciated that the MS Windows in the above flow chart is merely an example of an operating system. Other operating systems, such as MS DOS and Macintosh OS, can be used to perform the interrupt in place of MS Windows.

The invention has been described with reference to a specific exemplary embodiment thereof. Various modification and changes may be made thereunto without departing from the broad spirit and scope of the invention. The specification and drawings are, accordingly, to be regarded in an illustrative rather than a restrictive sense; the invention is limited only by the provided claims.

We claim:

1. A system having a communication network connecting a plurality of computers, said system comprising:

a first program module and an associated first parameter file;

a second program module and an associated second parameter file;

said first program module containing means for sending a first command to said second parameter file;

said second program module containing means for sending a second command to said first parameter file;

said first program module containing means for executing said second command without returning result of execution to said second program module;

said second program module containing means for executing said first command without returning result of execution to said first program module;

said first parameter file being located in a first computer;

said first and said second program modules being located in a second computer;

means for downloading at least a portion of said first parameter file to said second computer; and means for invoking said first program module in response to downloading of said first parameter file.

2. The system of claim 1 wherein said first and said second parameter files are ASCII files.

3. The system of claim 1 wherein said means for invoking comprises means for using an extension of said first parameter file to invoke said first program module.

4. The system of claim 1 wherein each parameter file has a network accessible address, said system further comprising a cache located in said second computer for storing downloaded parameter files and their corresponding addresses.

5. The system of claim 4 wherein said addresses comprise uniform resource locators.

6. The system of claim 4 wherein said second computer further comprises a display window containing one or more icons indicating downloadable parameter files, each of said indicated parameter files capable of invoking a third program module, said third program module downloading a further parameter file related to one of said indicated parameter files invoking said third program module.

7. The system of claim 1 wherein said means for downloading comprises a hypertext transport protocol.

8. The system of claim 1 wherein said first computer is a server and said second computer is a client.

9. The system of claim 8 wherein said first parameter file is created in a third computer, said third computer being a client, said system further comprising means for uploading said first parameter file from said third computer to said first computer.

10. A computer connected to a communication network connecting a plurality of clients and servers, said computer comprising:

a first program module and an associated first parameter file;

a second program module and an associated second parameter file;

said first program module containing means for sending a first command to said second parameter file;

said second program module containing means for sending a second command to said first parameter file;

said first program module containing means for executing said second command without returning result of execution to said second program module;

said second program module containing means for executing said first command without returning result of execution to said first program module;

said first parameter file containing an address of a remote file located in one of said clients and said servers; and said first program module having a behavior determined by said remote file.

11. The computer of claim 10 further comprising means for communicating with said clients and said servers using a hypertext transport protocol.

12. The computer of claim 10 wherein said address is a uniform resource locator.

13. The computer of claim 11 further comprising a first cache, accessible by said first and said second program modules, for storing a predetermined number of addresses processed by said means for communicating.

14. The computer of claim 13 further comprising a browser displaying at least one icon associated with a parameter file, and a second cache associated with said browser for storing addresses processed by said browser.

* * * * *